United States Patent [19]
Yamagata et al.

[11] Patent Number: 5,715,357
[45] Date of Patent: Feb. 3, 1998

[54] REPRODUCING APPARATUS

[75] Inventors: Shigeo Yamagata, Kanagawa-ken; Hiroyuki Horii, Tokyo; Hirokazu Takahashi; Yasutomo Suzuki, both of Kanagawa-ken; Masahiko Ogawa, Tokyo, all of Japan

[73] Assignee: Canon Kabushiki Kaisha, Tokyo, Japan

[21] Appl. No.: 431,168

[22] Filed: Apr. 27, 1995

Related U.S. Application Data

[63] Continuation of Ser. No. 128,047, Sep. 27, 1993, abandoned, which is a continuation of Ser. No. 779,132, Oct. 16, 1991, abandoned, which is a continuation of Ser. No. 624,512, Dec. 7, 1990, abandoned, which is a continuation of Ser. No. 190,594, May 5, 1988, abandoned.

[30] Foreign Application Priority Data

| May 15, 1987 | [JP] | Japan | 62-119313 |
| May 16, 1987 | [JP] | Japan | 62-119797 |
| May 16, 1987 | [JP] | Japan | 62-119798 |

[51] Int. Cl.$^6$ .................................... H04N 5/91
[52] U.S. Cl. .................................... 386/96; 386/106
[58] Field of Search .................................... 358/310, 335, 358/341, 342, 343, 319; 360/9.1, 11.1, 27, 33.1, 35.1, 19.1; 386/96, 101, 104, 105, 106, 39

[56] References Cited

U.S. PATENT DOCUMENTS

| 3,829,610 | 8/1974 | Meeussen et al. | 369/111 X |
| 4,051,526 | 9/1977 | Steinkopf et al. | 360/27 X |
| 4,286,281 | 8/1981 | Suzuki | 368/319 |
| 4,302,837 | 11/1981 | Tanaka et al. | 358/144 X |
| 4,433,347 | 2/1984 | Sugiyama et al. | 358/342 |
| 4,463,389 | 7/1984 | Golding | 360/8 X |
| 4,476,499 | 10/1984 | Kanamaru et al. | 358/342 |
| 4,578,718 | 3/1986 | Parker et al. | 360/27 X |
| 4,672,472 | 6/1987 | Sugiyama | 358/342 X |
| 4,707,733 | 11/1987 | Shinyagaito et al. | 360/11.1 X |
| 4,769,722 | 9/1988 | Itoh et al. | 360/27 |
| 4,772,962 | 9/1988 | Tanaka et al. | 360/35.1 X |
| 4,816,928 | 3/1989 | Sasaki et al. | 360/35.1 |

FOREIGN PATENT DOCUMENTS

| 48801 | 3/1984 | Japan |
| 95079 | 5/1987 | Japan |
| 119702 | 6/1987 | Japan |
| 178079 | 11/1987 | Japan |
| 1267 | 1/1988 | Japan |
| 28179 | 2/1988 | Japan |
| 107382 | 5/1988 | Japan |

*Primary Examiner*—Andrew L. Sniezek
*Attorney, Agent, or Firm*—Robin, Blecker, Daley and Driscoll

[57] ABSTRACT

A reproducing apparatus for reproducing signals from a record bearing medium, on which a video signal and some other signal are recorded in a plurality of blocks, includes discriminating circuitry for determining at least whether the signal recorded in each of the blocks is a video signal or other signal, a storing device for storing the result of the discrimination made by the discriminating circuitry, a reproducing unit for selectively reproducing the records of the blocks on the basis of information obtained from the storage device, and a display. Control of the apparatus is such that, if a signal recorded in a block currently accessed for reproduction is determined not to be a video signal, the display so indicates.

10 Claims, 22 Drawing Sheets

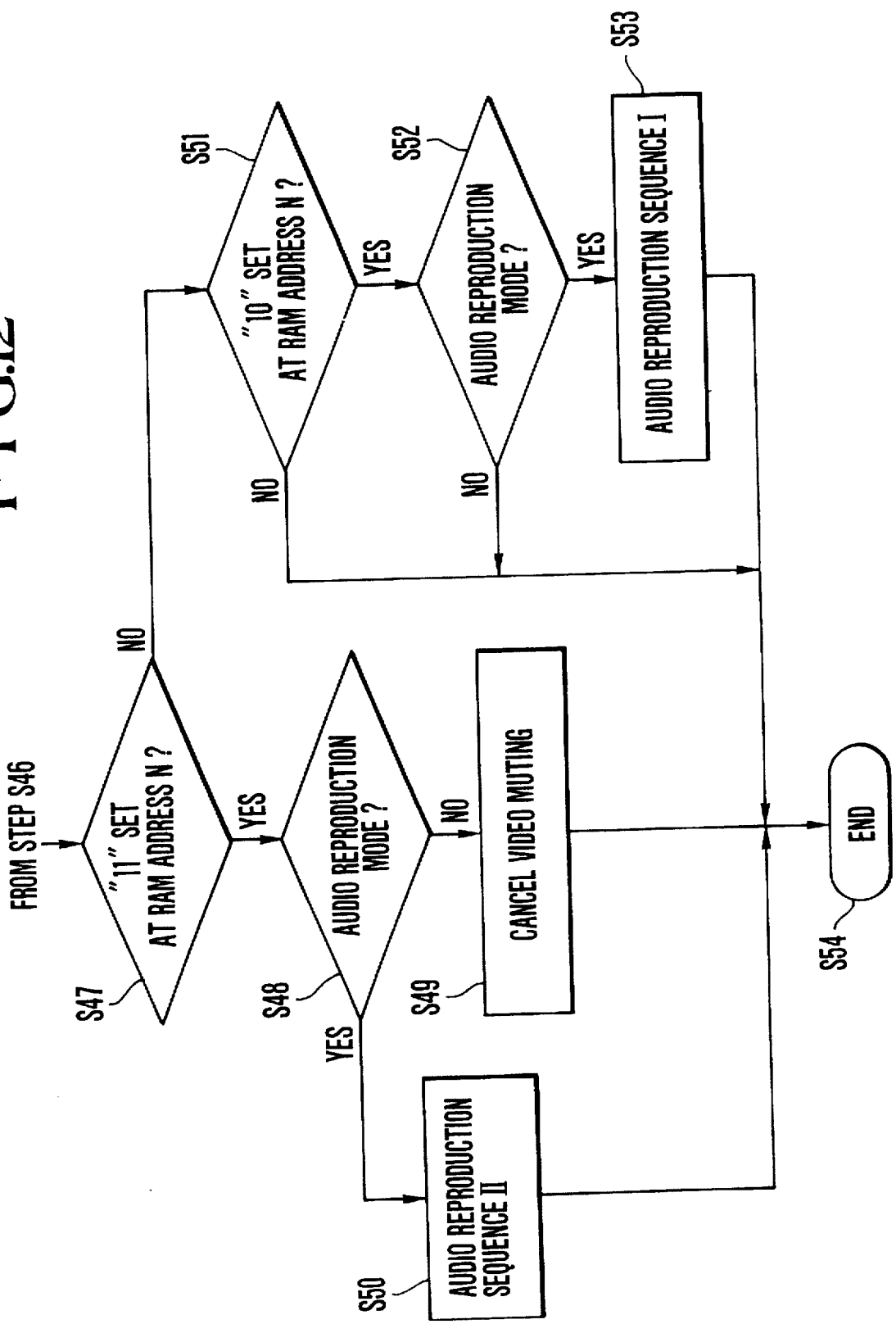

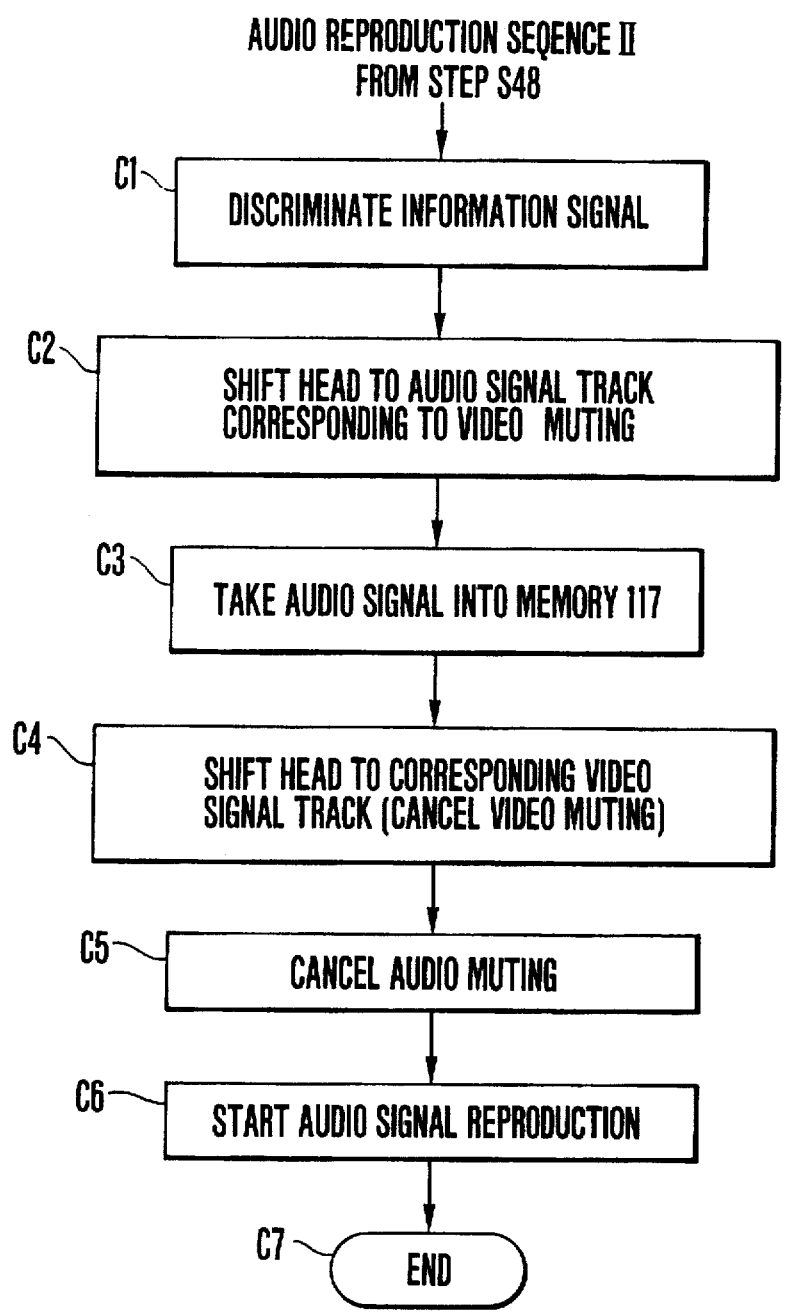

FIG. 21(a)

| TRACK No. | 1 | 2 | 3 | 4 | 5 | 6 | 7 | 8 | 9 | 10 | 11 | 12 | 13 | 14 | 15 | .... |
|---|---|---|---|---|---|---|---|---|---|---|---|---|---|---|---|---|
| A/V | V | V | V | V | V | V | V | V | V | V | a1 | a2 | b1 | b2 | b3 | |
| AUDIO SEQUENCE 1 | | | | a1 | | | | a2 | | | | | | | | |
| AUDIO SEQUENCE 2 | | b1 | | | | b3 | | b2 | | | | | | | | |

FIG. 21(b)

| REPRODUCTION TABLE | | | | | | | | | | | | | | | | |
|---|---|---|---|---|---|---|---|---|---|---|---|---|---|---|---|---|
| ORDER FOR REPRODUCTION | | 1 | 2 | 3 | 4 | 5 | 6 | 7 | 8 | 9 | 10 | 11 | 12 | 13 | 14 | 15 |
| TRACK No. | MODE ① | 11 | 13 | ···· | | | | | | | | | | | | |
| | ② | 13 | 11 | ···· | | | | | | | | | | | | |
| | ③ ⑤ | 1 | 3 | 11 | 13 | 5 | 9 | 10 | ···· | | | | | | | |
| | ④ ⑥ | 1 | 13 | 3 | 11 | 5 | 9 | 10 | ···· | | | | | | | |

FIG. 21(c)

| ORDER FOR REPRODUCTION OF VIDEO SIGNAL | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TRACK NO. | MODE ① | 4 | 7⌐ | 2 | 6 | 8⌐ | ··· | | | | | | | | | |
| | ② | 2 | 6 | 8⌐ | 4 | 7⌐ | ··· | | | | | | | | | |
| | ③ | 1⌐ | 3⌐ | 4 | 7⌐ | 2 | 6 | 8⌐ | 5⌐ | 9⌐ | 10⌐ | ··· | | | | |
| | ④ | 1⌐ | 2 | 6 | 8⌐ | 3⌐ | 4 | 7⌐ | 5⌐ | 9⌐ | 10⌐ | ··· | | | | |
| | ⑤ | 1 | 3 | 4 | 7 | 2 | 6 | 8 | 5 | 9 | 10 | ··· | | | | |
| | ⑥ | 1 | 2 | 6 | 8 | 3 | 4 | 7 | 5 | 9 | 10 | ··· | | | | |

⌐:STOP

REPRODUCING APPARATUS

This is a continuation application under 37 CFR 1.62 of prior application Ser. No. 08/128,047 filed on Sep. 27, 1993 (aban.) which is a cont. of Ser. No. 07/779,132 filed on Oct. 16, 1991 (aban.) which is a cont. of Ser. No. 07/624,512 filed on Dec. 7,1990 (aban.) which is a cont. of Ser. No. 07/190,594 filed on May 5, 1988 (aban.)

Background of the Invention

1. Field of the Invention

This invention relates to a reproducing apparatus for reproducing information signals such as an audio signal, a video signal, etc., recorded in a plurality of recording blocks within storing means such as a magnetic disc or the like.

2. Description of the Related Art

Heretofore, on the magnetic disc from which the signal record is to be reproduced by the apparatus of the above stated kind, a video signal and an audio signal are recorded on one and the same disc in a commingled state. Meanwhile, for reproduction of the recorded audio signal, some control data is also recorded along with the audio signal in each audio signal recording track. The audio signal recording track can be any of the tracks available on the disc as there is no particular restrictions on the selection of the audio recording track.

In reproducing a record from the disc on which the video and audio signals are recorded in a commingled state, however, if the reproducing apparatus is arranged to be capable of reproducing nothing else but the video signal and if any RF signal is recorded in a track, the apparatus considers it to be recorded track. In that event, the apparatus demodulates the reproduced RF signal by a reproduction processing circuit and supplies it to a monitor. Then, when an audio signal is reproduced from an audio signal a recording track under such a condition, the reproduced audio signal becomes hardly acceptable.

Summary of the Invention

It is an object of this invention to provide a reproducing apparatus which solves the above stated problem of the prior art and is arranged to be capable of reproducing a video signal from a record bearing medium without being affected by any signal other than the video signal in case that the video signal is recorded together with other signals on the same recording medium.

It is another object of the invention to provide a reproducing apparatus which is arranged to preclude any signal other than a video signal from being reproduced by mistake on a monitor.

Under this object, a reproducing apparatus arranged according to this invention as a preferred embodiment thereof to reproduce signals from a plurality of blocks formed on a record bearing medium having a video signal and other signals recorded there comprises: discriminating means for discriminating the signals recorded within the blocks by making a discrimination at least between a video signal and other signals; storing means for storing the result of the discrimination made by the discriminating means; reproducing means for selectively reproducing signals from the blocks on the basis of data obtained from the storing means; and display means which, in the event of that the signal recorded in each block is found to be not a video signal, makes a display showing the finding on a monitor.

It is a further object of the invention to provide a reproducing apparatus which, in reproducing a video signal while changing the reproducing position thereof on a record bearing medium from one position over to another, is capable of adequately accomplishing reproduction without being affected by signals other than the video signal.

Under that object, a reproducing apparatus embodying this invention as a preferred embodiment thereof for reproducing signals from a record bearing medium on which video and audio signals are recorded in a commingled state is provided with an operation part which instructs for a renewal of a reproducing position; and is arranged to reproduce the audio signal after detecting that no instruction is made for a change in the reproducing position, so that audio signal record bearing blocks can be skipped without reproducing the audio signal during the so-called fast-feed reproduction.

It is a further object of the invention to provide a reproducing apparatus which is capable of reproducing a video signal and an information signal related to the video signal in an adequately combined state from a record bearing medium on which they are recorded in a commingled state.

It is a still further object of the invention to provide a reproducing apparatus which is capable of reproducing a video signal and an audio signal related to the video signal in an adequate sequence from a record bearing medium on which they are recorded in a commingled state.

Under this object, a reproducing apparatus embodying the invention as a preferred embodiment thereof for reproducing signals from a record bearing medium having a video signal record together with a record of sequences of sounds represented by an audio signal which continues timewise straddling a plurality of recording tracks is arranged to have the following functions, in case where the medium bears a plurality of sound or audio signal sequences: A function in which reproduction is serially performed for each audio signal sequence according to the track number assigned to the first track of each of these sequences; and another function in which reproduction is serially performed according to a video signal recording track corresponding to the first audio signal record track of each audio signal sequence.

It is a further object of the invention to provide a reproducing apparatus which is capable of selecting one of different reproducing orders as desired.

Other objects and features of the invention will become apparent from the following detailed description of embodiments thereof taken in connection with the accompanying drawings.

BRIEF DESCRIPTION OF THE DRAWINGS

FIGS. 11 to 20 are flow charts showing the operation of a system controller shown in FIG. 10. FIGS. 21(a), 21(b) and 21(c) are illustrations of the signal reproducing order of the reproducing apparatus arranged as the same embodiment.

DETAILED DESCRIPTION OF THE PREFERRED EMBODIMENTS

The embodiment of this invention described below is provided with a discrimination circuit which is arranged in combination with a reproduced RF signal detection circuit to demodulate a reproduced RF signal when the RF signal is detected and to discriminate the recorded signal between a video signal and an audio signal. Further, when a disc employed as record storing means is set in place, all the recording tracks are first reproduced and information thus obtained from the above stated discrimination circuit is stored at a memory disposed within a system controller. Then, in selectively reproducing records from the tracks, the audio signal records are first reproduced from audio signal tracks and supplied to a monitor, so that any disagreeable noises can be prevented from being generated. However, it is to be understood that the invention is of course not limited to the apparatus of this kind.

In other words, while a magnetic record bearing disc is employed as the storing means having a plurality of storing blocks in the case of this specific embodiment, the magnetic disc may be replaced with a tape-shaped record bearing medium or with a semiconductor memory or such a solid-state memory as a Bloch line memory.

Figure 1:
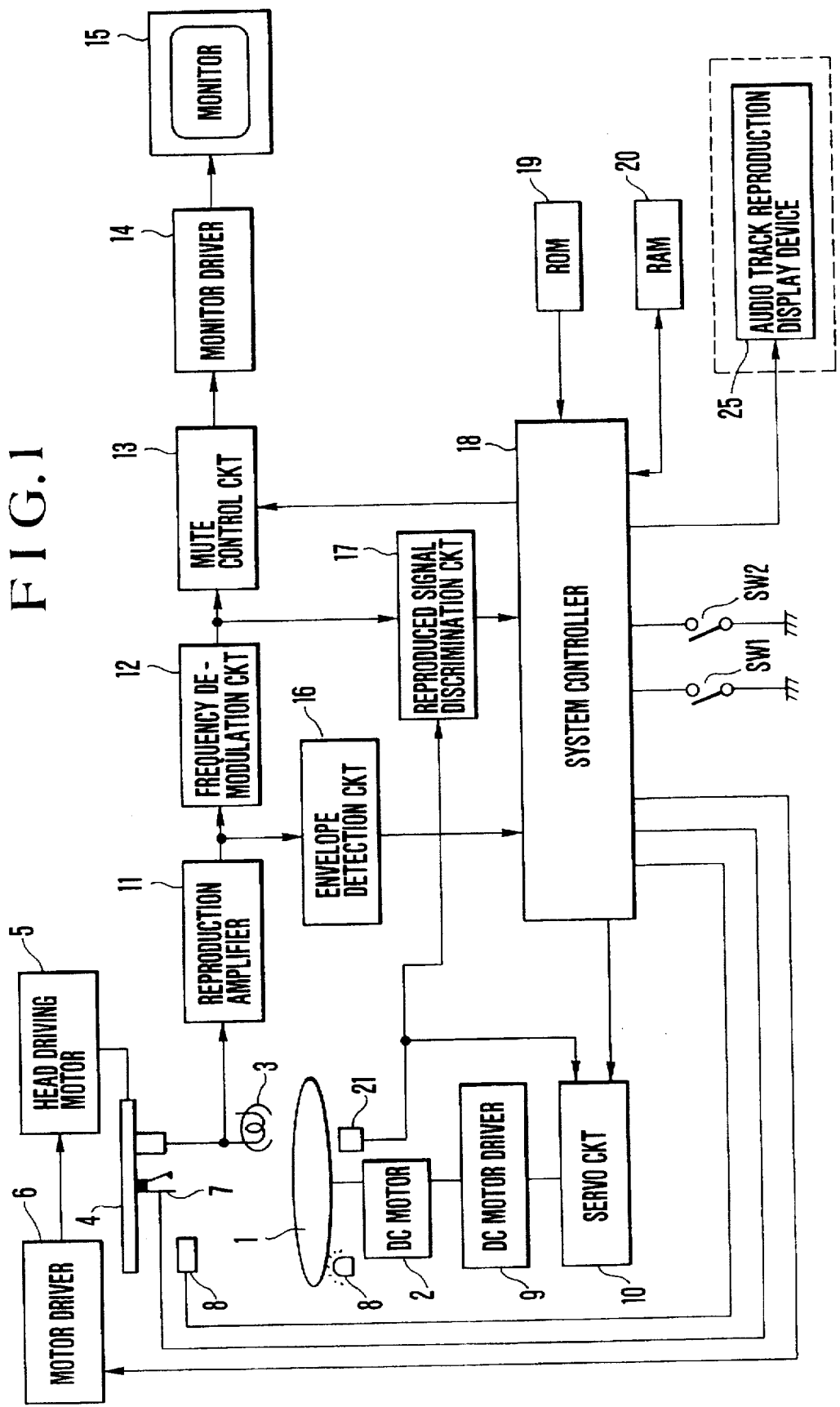
FIG. 1 is a block diagram showing a first embodiment of this invention.

The embodiment is arranged as shown in a block diagram in FIG. 1, which includes: A magnetic disc 1; a DC motor 2 which is arranged to rotate the magnetic disc 1 at a given speed; a magnetic head 3; a head shifting device 4 which is arranged to shift the position of the magnetic head 3; a head driving motor 5 which is provided for driving the head shifting device 4; a motor driver 6 which is arranged to drive the head driving motor 5; an innermost track detection switch (SW) 7 which is arranged to turn on when the magnetic head 3 has access to the innermost track on the magnetic disc 1; a magnetic disc detection device 8 which consists of a photo transistor and a light emitting diode; a DC motor driver 9 which is arranged to drive the DC motor 2; a servo circuit 10 which is arranged to control the DC motor driver 9 for causing the magnetic disc 1 to rotate at a constant speed; a reproduction amplifier 11 which is arranged to amplify a reproduced signal coming from the magnetic head 3; a frequency demodulation circuit 12 which is arranged to demodulate a signal coming from the reproduction amplifier 11; a mute control circuit 13 which is arranged to determine whether the signal output of the frequency demodulation circuit 12 is to be muted or not; and a monitor driver 14 which is arranged to drive a monitor 15. Further, an envelope detection circuit 16 is arranged to receive the signal from the reproduction amplifier 11 and to detect the envelope thereof. The output of the envelope detection circuit 16 is supplied to a system controller 18. A reproduced signal discrimination circuit 17 is arranged to receive the output signal of the frequency demodulation circuit 12 and to supply the output thereof to the system controller 18. A ROM 19 is arranged to store the control program of the system controller 18. A RAM 20 is arranged to have reading and writing actions performed thereon by the system controller 18. A track-up switch (or up-switch) SW1 and a track-down switch (or down-switch) SW2 are connected to the system controller 18. A PG pulse generator 21 is arranged to generate a PG pulse signal in synchronism with the rotation of the magnetic disc 1. The output of the PG pulse generator 21 is supplied to the servo circuit 10 and the reproduced signal discrimination circuit 17. A metal piece is buried in the magnetic disc 1. The PG pulse signal is generated with this metal piece detected by the PG pulse generator 21. An audio track reproduction display device 25 is arranged to make a display indicative of reproduction from audio signal record bearing tracks.

This embodiment operates as follows: A total of 50 tracks are formed on the magnetic disc 1. Of these tracks, a track formed in the outermost part of the magnetic disc 1 is considered to be the first track and a track formed in the innermost part of the disc 1 to be the 50th track. An action of shifting the magnetic head 3 toward the innermost part of the magnetic disc 1 hereinafter will be called a track up action and an action of shifting it toward the outermost part of the disc 1 a track down action.

Figure 2:
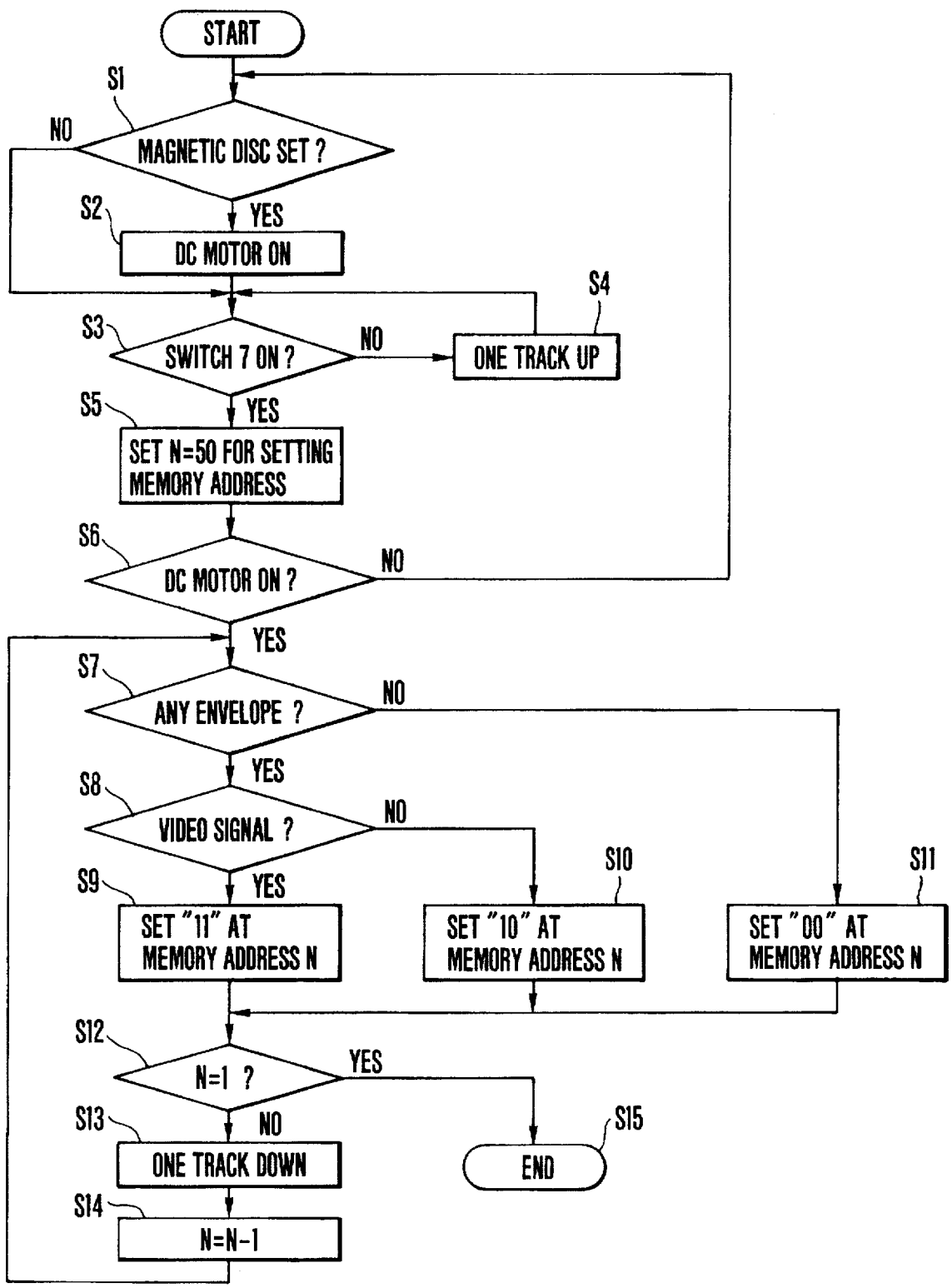
FIGS. 2, 6, 7 and 8 are flow charts showing the operation of a system controller 18 shown in FIG. 1.

Referring to the flow chart of FIG. 2 which shows the operation of the system controller 18, when the magnetic disc 1 is set in place, the operation of the embodiment is performed as follows: A power supply is effected to the apparatus when a power supply switch which is not shown is closed. Then, an initial setting action is performed with the system controller 18 reset. The mute control circuit 13 is then initialized in such a way as to have its output muted. At a step S1 after completion of the initializing process, a check is made to find if the magnetic disc 1 is set in place through the signal of the magnetic disc detection device 8 supplied to the system controller 18. If the magnetic disc 1 is found to have been set, the flow of operation proceeds to a step S2. At Step S2: The system controller 18 controls the servo circuit 10 to cause the magnetic disc 1 to be rotated by the DC motor driver 9 and the DC motor 2. At a step S3: The system controller 18 makes a check for the on or off-state of the switch 7 to see if the magnetic head 3 has access to the 50th track which is located in the innermost place of the disc 1. If the switch 7 is found to be on, the flow of operation comes to a step S5. If not the flow proceeds to a step S4. At the step S4: The magnetic head 3 is shifted inward to an extent corresponding to one track. The head 3 is shifted by the head shifting device 4 with the motor driver 6 controlled and caused by the controller 18 to drive the head driving motor 5. In other words, the head 3 eventually comes to have access to the innermost track (the 50th track) with the steps S3 and S4 repeatedly executed. With the head 3 having come to the innermost track, the flow proceeds to the step S5. Step S5: A parameter N for setting an address at the RAM 20 is set at 50. The parameter N is indicative of also a current track position. Next, the flow proceeds to a step S6. Step S6: A check is made for the on-state of the DC motor 2. If the motor 2 is found to be on, the flow proceeds to a step S7. If not, the flow branches off to the step S1. In other words, the flow is arranged to come to the step 7 with the motor 2 having been turned on. This indicates that the magnetic disc 1 has been set in place. Step S7: The system controller 18 reads the output of the envelope detection circuit 16 to find whether there is an envelope. If the envelope is found, the flow proceeds to a step S8. If not, the flow comes to a step S11. At the step S8: The system controller 18 reads the output of the reproduced signal discrimination circuit 17 to find whether the reproduced signal is a video signal or something else. If the signal is found to be a video signal, the flow proceeds to a step S9. If not, the flow comes to a step S10. At steps S9, S10 and S11: At the address N of the RAM 20, "11" is written into the RAM 20 in case that the reproduced signal is a video signal, "10" in the case of some other signal and "00" in the case of no envelope. In other words, data is set at the RAM 20 indicating whether the signal recorded in the track N is a video signal or indicating whether the track is a vacant track. After this, the flow proceeds to a step S12. At the step S12, a check is made to find if the parameter N is "1." If not, the flow proceeds to a step S13. Step S13: The head 3 is shifted in the track down direction. Step S14: From the value of the parameter N is subtracted "1" and the flow branches off to the step S7 to perform the same action as mentioned in the foregoing. In case that a state of N=1 is found at the step S12, it indicates that data on all the tracks from the 50th track to the first track has been completely written into the RAM 20. In that instance, therefore, the flow proceeds to a step S15 and thus comes to an end.

Figure 3:
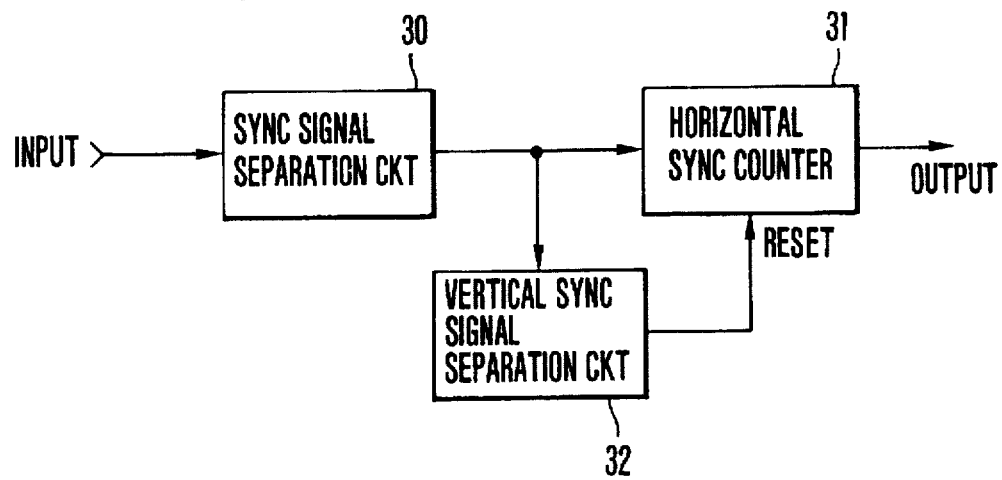
FIGS. 3 and 4 are block diagrams showing the details of the reproduced signal discrimination circuit shown in FIG. 1.

Referring now to FIG. 3, the reproduced signal discrimination circuit 17 is arranged as follows: The circuit 17 is arranged to receive as an input thereof the output of the frequency demodulation circuit 12. The circuit 17 includes a synchronizing (hereinafter referred to as sync for short) signal separation circuit 30. In case that the input signal is a video signal, the sync signal included in the video signal is separated by the circuit 30. The output signal of the circuit 30 is supplied to a horizontal sync counter 31 and a vertical sync signal separation circuit 32. The horizontal sync counter 31 is arranged to be reset by a signal produced from the vertical sync signal separation circuit 32. More specifically, the horizontal sync counter 31 counts the pulses of the horizontal sync signal for a period of time between one vertical sync signal and another to produce a high level signal indicative of that the reproduced signal is a video signal in case that the counted value thereof is within a given range, for example, from 256 to 270. In short, the reproduced signal discrimination circuit 17 makes a discrimination between a video signal and some other signal by detecting the number of sync signals included in the input signal. Despite of the simple arrangement thereof, the circuit 17 is capable of adequately making the discrimination. Therefore, the step S8 of FIG. 2 can be executed on the basis of the output of the circuit 17.

Figure 4:
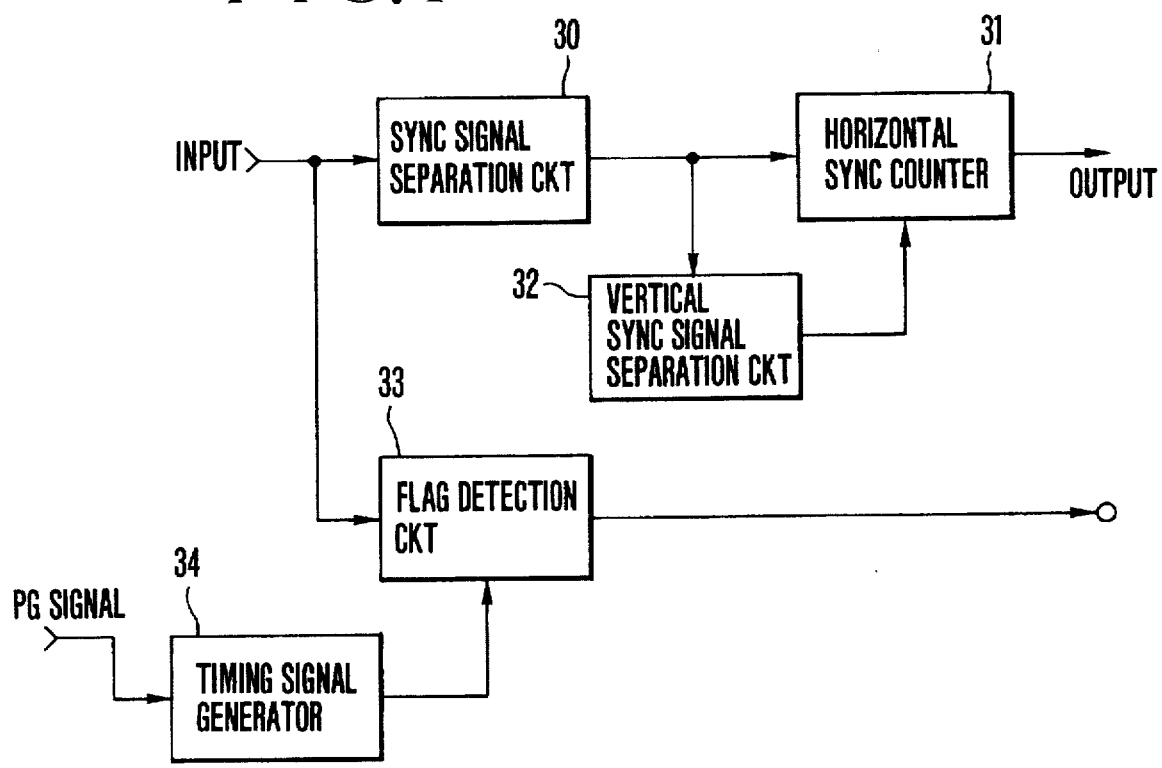
Figure 5A:
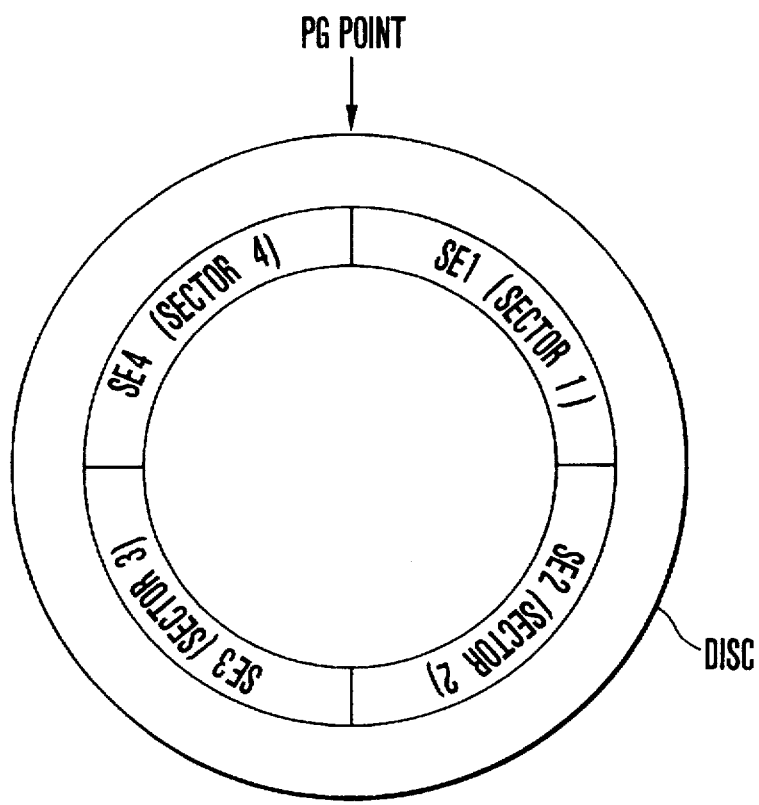
FIGS. 5(a) and 5(b) show the format in which audio signal is recorded in recording tracks.
Figure 5B:
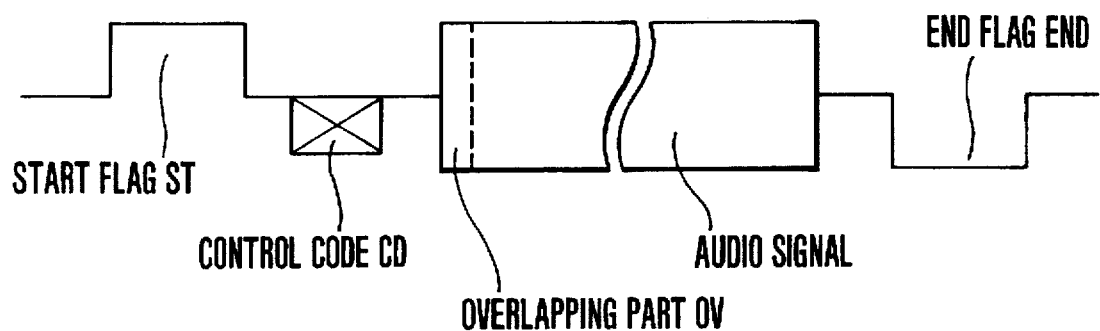
Figure 6:
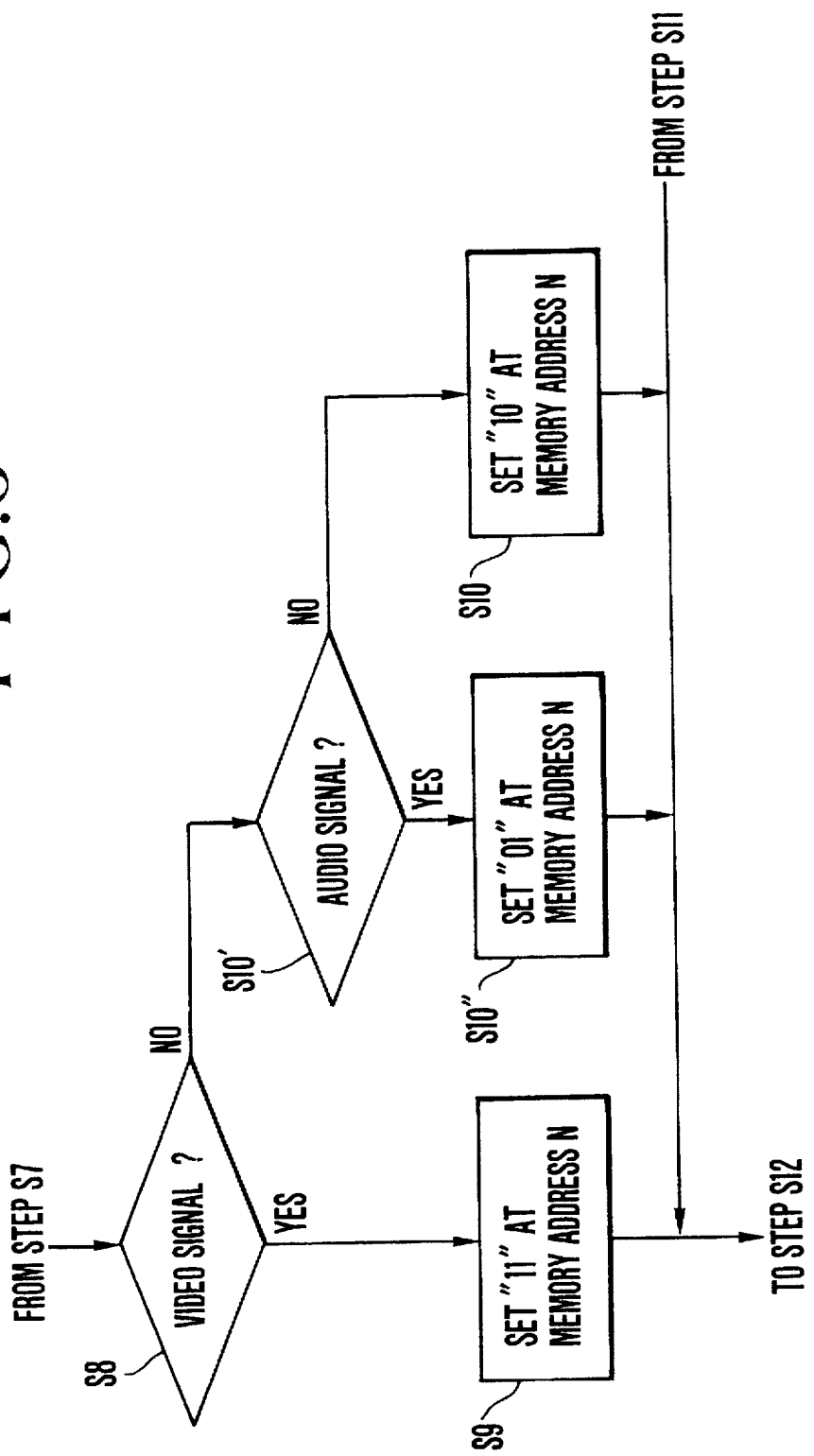

Further, for more reliable result of discrimanation of the reproduced signal, the circuit 17 may be arranged to make a discrimination between an audio signal and some other signal as shown in FIG. 4. Briefly stated, the recording format of the audio signal is as follows: FIG. 5(a) shows one of the audio record tracks formed on the magnetic disc. Each of the audio record track is divided into four sectors SE1, SE2, SE3 and SE4. FIG. 5(b) shows by way of example the format of the sector. Within each of the sectors, an audio sector start signal is recorded as a start flag ST at a start point of the sector. The start flag ST is followed by a control code CD which is provided for reproduction of the audio signal record track. The control code CD includes data for the time base compression rate of the audio signal, a video signal recording track No. to which the audio signal is correlated and, in the case that the audio signal record is continuously extending over a plurality of tracks, the track No. of the track at which the audio signal record begins and that of an ensuing audio signal record track, etc. The audio signal is recorded within an area following such data in a time base compressed state. To maintain the continuity among the audio signal records of sectors, the audio signal includes an overlapped part OV which is located at the beginning of the audio signal recording area. After the audio signal recording area, an end flag END is recorded to indicate the end of the sector. A flag detection circuit 33 of FIG. 4 is arranged to detect the start flag ST of the audio sector shown in FIG. 5(b). Therefore, the discrimination as to whether a track is an audio record track or not can be made by detecting this start flag ST. More specifically, since the start flag ST exists at the start point of each of the four sectors of an audio signal record track, a timing signal generator 34 is arranged to generate gate pulses at time points corresponding to the start flags on the basis of the PG signal which is generated per turn of the magnetic disc 1. Therefore, the presence or absence of the start flag ST can be found through this arrangement. In case that the start flag ST is detected by a flag detection circuit 33, a signal is supplied to the system controller 18 informing it that the track is an audio signal record track. Further, in the event of detection of the audio signal, a portion of FIG. 2 including the steps S8 to S11 is changed as shown in the flow chart of FIG. 6. Referring to FIG. 6, data "01" is written, at steps S10' and S10", into the RAM 20 as data indicative of the audio signal record track.

Figure 7:
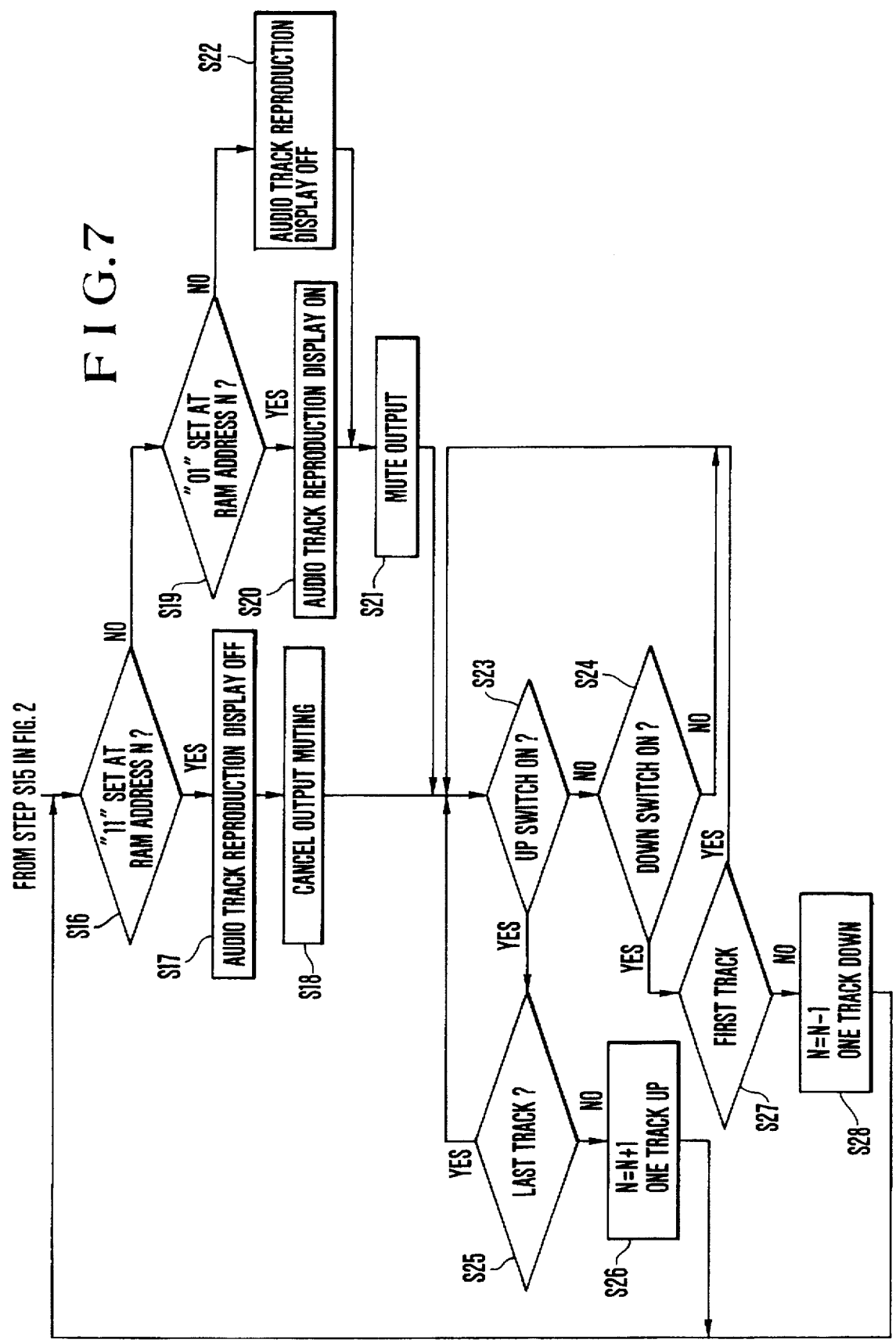

The video signal is actually reproduced from the magnetic disc 1 in the following manner: The embodiment is assumed to have the reproduced signal discrimination circuit 17 arranged as shown in FIG. 4, i.e., arranged to be capable of finding the reproduced signal to be a video signal or an audio signal or some other signal. When the magnetic disc 1 is set in place according to the flow of operation as shown in FIGS. 2 and 6, record information (or data) on all the tracks from the 50th to the first track is automatically stored in the RAM 20. With the information on the 50th to first tracks thus completely taken into the RAM 20, the embodiment comes to perform an actual reproducing operation. The actual reproducing operation is as shown in FIG. 7. The flow of operation comes from the step S15 of FIG. 2 to a step S16 of FIG. 7. At the step S16: Data stored at the address N of the RAM 20 (the initial value of N is "1") is checked to find if it is "11" which indicates a video signal record. If so, the flow proceeds to a step S17. At the step S17, an audio reproduction display which will be described later is turned off. At a step S18: The system controller 18 causes the mute control circuit 13 to cancel its muting action and to allow the reproduced signal to be supplied to the monitor 15. In case that the RAM data is found to be not "11" at the step S16, the flow comes to a step S19. At the step S19: The RAM data is checked for "01". If the RAM data is found to be "01", the flow comes to a step S20. At the step S20: The audio track reproduction display is turned on. At a step S21: The system controller 18 causes the mute control circuit 13 of FIG. 1 to mute the output. If the RAM data is found to be not "01" at the step S19, the flow comes to a step S22. At the step S22: The audio track reproduction display of the display device 25 is turned off. Meanwhile, the flow comes to the step S21 to mute the output to the monitor 15. Following that, the flow proceeds to a step S23. Step S23: The position of the track-up switch which corresponds to the switch SW1 of FIG. 1 is checked. If the switch is found to be in an on-state, the flow comes to a step S25. If not, the flow proceeds to a step S24. Step S24: The position of the track-down switch which corresponds to the switch SW2 of FIG. 1 is checked. If the switch is found to be in its off-state, the flow comes to a step S23. At the step S25: The value of the track address N (RAM address) is checked for the last track. If it is found to be the last track, the flow comes to the step S23. If not, the flow proceeds to a step S26. At the step S26: The value of the address N is incremented by one. The magnetic head 3 is shifted in the track-up direction. The flow then comes to the step S16 to repeat the above stated reproduction control processes. In case that the flow comes from the step S24 to a step S27, the track address is checked for the first track. If the address is found to be the first track, the flow comes to the step S23. If not, the flow proceeds to a step S28. At the step S28: The magnetic head 3 is shifted in the track-down direction. The flow then branches off to the step S16 to repeat the foregoing steps of flow. As apparent from the description given above, even in case that a magnetic disc having video and audio signals recorded thereon in a commingled state is set on an apparatus for reproducing only a video signal, the embodiment effectively prevents disagreeable noises from appearing on the monitor when the magnetic head comes to have access to an audio signal record track by virtue of the above stated arrangement of discriminating the records contained in all the tracks between the audio or video signal and other signals when the disc is set on the apparatus. Further, the audio track reproduction display device 25 which is encompassed with a broken line in FIG. 1 and is arranged to operate when the head is having access to an audio signal record track may be provided with an LED or LCD, which enables the operator to know whether a currently accessed track is a vacant track. In the case of this embodiment, data "10" is arranged to indicate a track bearing a record which is neither a video signal nor an audio signal. If the data "10" is found for a currently accessed track upon examination of the address N of the RAM, a display may be made indicating that the record of the track is neither the video signal nor the audio signal.

In case that the reproduced signal discrimination circuit is arranged as shown in FIG 3 to make a discrimination between a video signal and some other signal, the data to be written into the RAM 20 include data "11" which indicates a video signal, data "10" which indicates a signal other than a video signal and data "00" which indicates a vacant track. In this instance, the display device may be also arranged to permit discrimination of tracks bearing the records of signals other than a video signal from vacant tracks during the process of a reproducing action on them.

In accordance with the arrangement of this embodiment as described in the foregoing, the signal records of all the tracks formed on the magnetic disc are reproduced and each track is found to be a video record track (or an audio record track) or a vacant track when the disc is set on the apparatus. The data thus obtained for each track is stored in the memory. A reproducing operation is then carried out with reference to the data thus stored beforehand. This arrangement not only permits muting any disagreeable noise to prevent it from being produced when the records are reproduced from tracks other than the video signal record track but also permits making a display showing the contents of the reproducing tracks. The arrangement thus enables the operator to correctly know the contents of the tracks.

Figure 8:
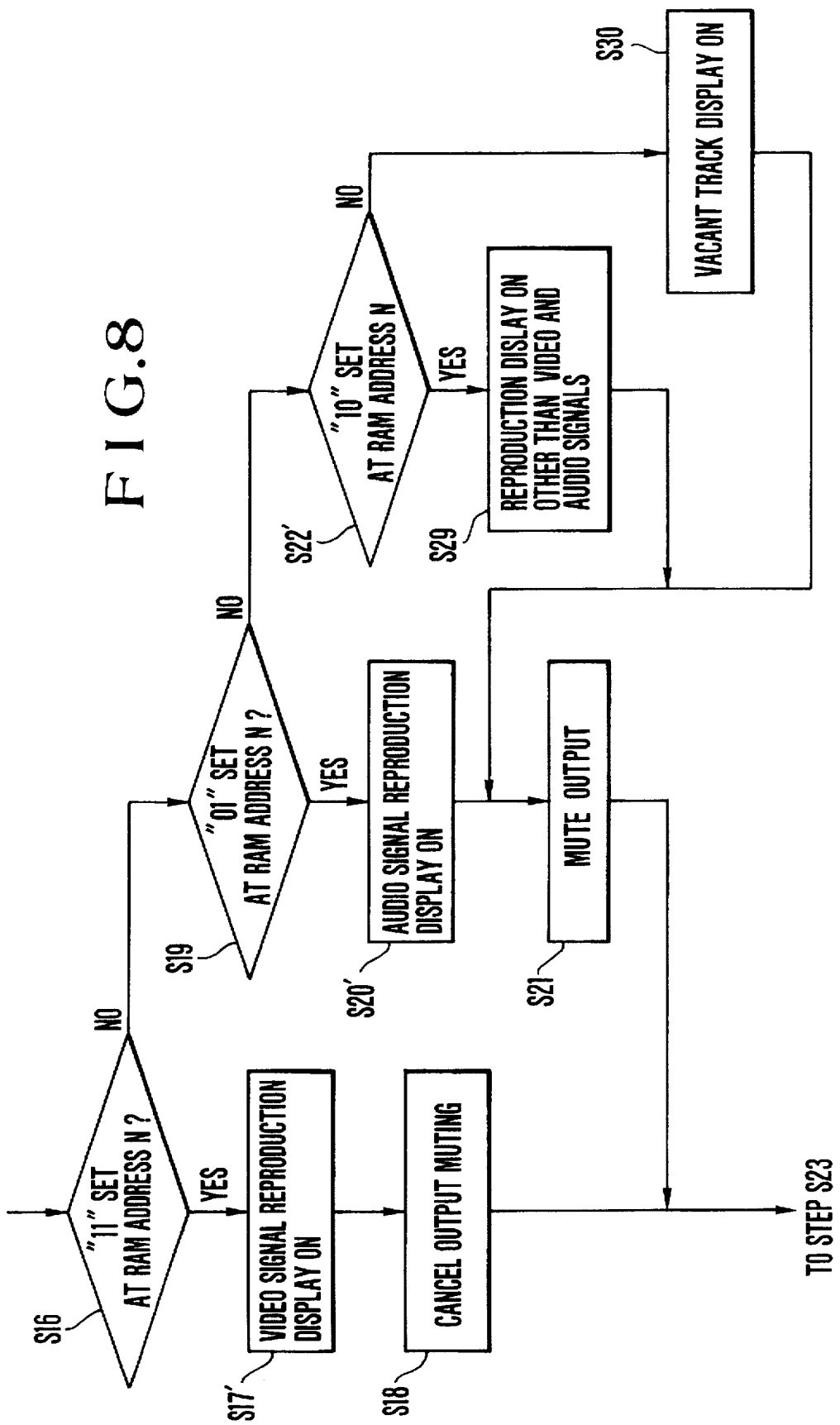

The steps S17, S20 and S22 of FIG. 7 may be changed as shown at steps S17', S20', S22', S29 and S30 of FIG. 8 with the audio track reproduction display device 25 of FIG. 1 arranged to make a display of the contents of each reproducing track to discriminate a video signal or an audio signal from other signals and also from a vacant track. More specifically, at the step S17' of FIG. 8, a video signal reproduction display is turned on. At the step S20', an audio signal reproduction display is turned on. At the step S22', the data of RAM address N is checked for the data "10". If the data is found to be "10", the flow comes to the step S29. At the step S29, a display of reproduced signal other than the video or audio signal is turned on. At the step S30, a display of a vacant track is turned on. In the case of FIG. 8, the embodiment is thus arranged to make a display for each reproducing track. The above stated displays are arranged such that, when one of them is turned on, other two are automatically turned off.

In an example of modification of the embodiment, a display is made on the monitor 15 showing whether or not a currently accessed reproducing track is an audio signal record track. Further, since a video signal and a time-base compressed audio signal or a digital data signal are recordable on the magnetic disc, the display device may be arranged to be capable of displaying that the reproduced signal is a video signal, audio signal, some other data or that the reproducing track is a vacant track by means of some LED or LCD or on a monitor.

While the embodiment is arranged to have record data for all the tracks taken into the memory when the magnetic disc is set in place, the arrangement may be changed to perform the storing action to be performed in response to the operation of a manual switch. In other words, the flow of operation as shown in FIG. 2 may be arranged to be executed when an all-track search switch which is connected to the system controller 18 of FIG. 1 is operated. In this case, if this all-track search switch is not operated, the record of the first track begins to be reproduced without having the record data of all the tracks stored in the memory. Then, the length of time required before commencement of actual reproduction from the magnetic disc can be shortened. The modification is advantageous, for example, in looking up the contents of the magnetic disc.

Figure 9A:
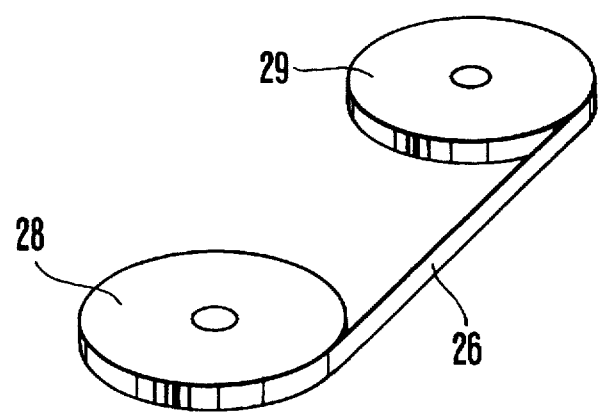
FIGS. 9(a) and 9(b) show another example of the recording medium.
Figure 9B:
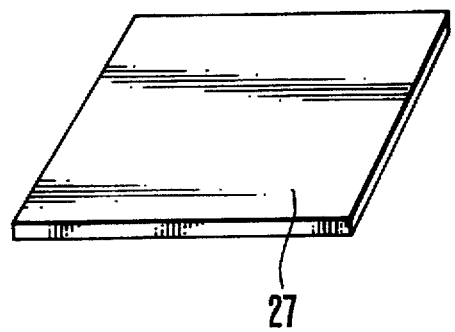

The arrangement of the embodiment is not limited to the use of the record bearing medium of the above stated kind and shape. Record bearing media other than the magnetic medium such as a tape-shaped medium 26 and a card-shaped medium 27 which are as shown in FIGS. 9(a) and 9(b), a solid-state memory such as a semi-conductor memory, etc. are of course also usable. In FIG. 9(a), reference numerals 28 and 29 denote tape winding reels.

The arrangement of the embodiment to reproduce signals from each record bearing block after finding the kind of the signal recorded in the block ensures that any disagreeable noise can be prevented from being reproduced and appearing on the monitor.

The magnetic disc mentioned in the foregoing description of the embodiment has audio and video signals recorded thereon in a commingled state. In order to reproduce the audio and video signals in combination from the disc, the record of the audio track is reproduced and a reproduction control information signal recorded there is demodulated to find thereby a related video signal record track. After the audio signal is taken into the memory, the video signal is reproduced by having access to the video signal record track found through the reproduced control signal. Following that, the audio signal which has been taken into the memory is reproduced through a time-base expanding process.

In carrying out a reproducing operation in the above stated manner, if a currently accessed reproducing track is an audio record track, it is difficult to promptly have access to an applicable related video signal track during a process of continuously shifting the reproducing track from one track to another or during the process of a look-up operation for a video signal record. There has been no method for promptly carrying out such a reproducing process. Another embodiment of this invention which is shown in FIG. 10, etc., are arranged to solve this problem.

Figure 10:
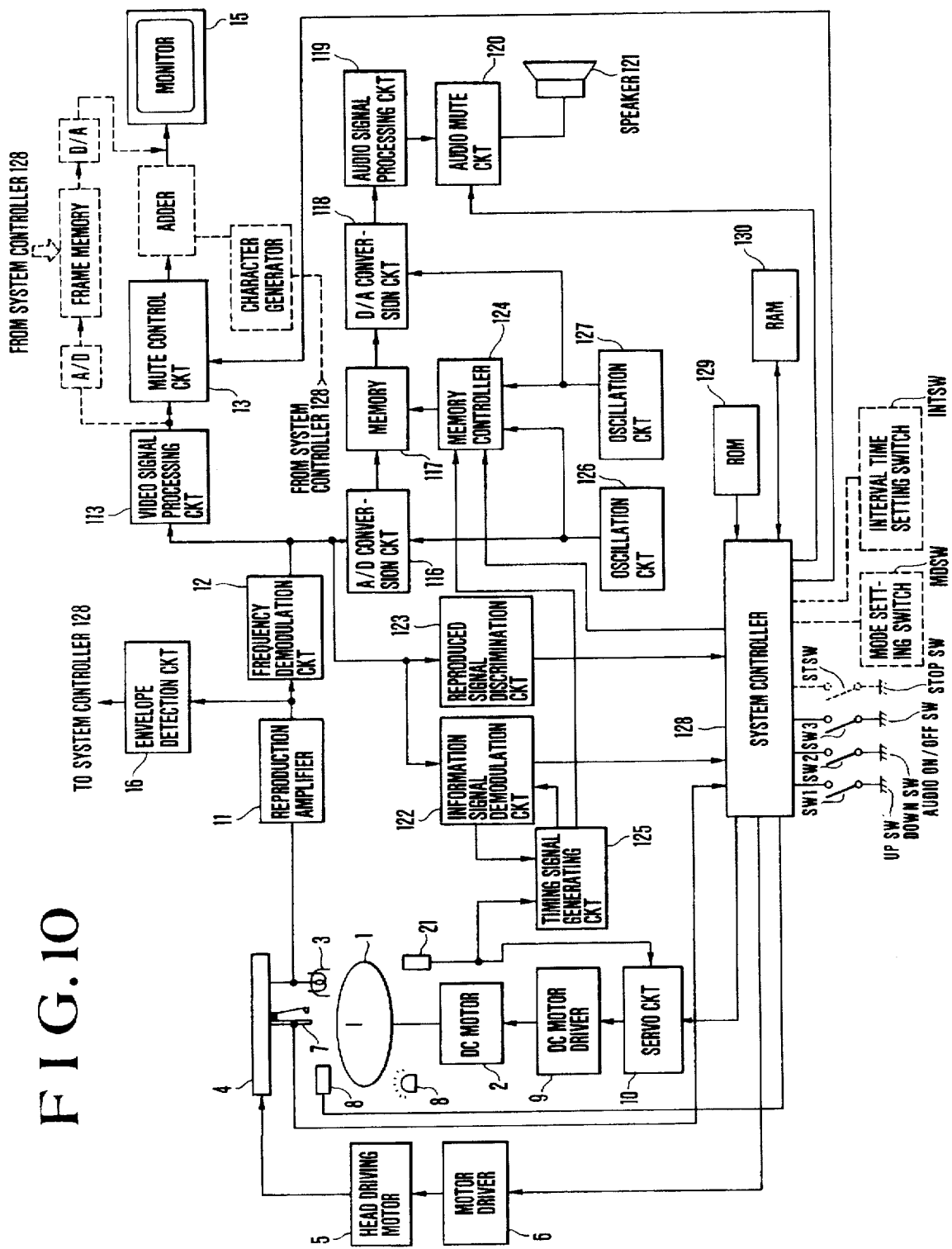
FIG. 10 is a block diagram showing another embodiment of the invention.

Referring to FIG. 10, the above stated embodiment is arranged as follows: In FIG. 10, the same parts as those of FIG. 1 are indicated by the same reference numerals and the details of them are omitted from description. A video signal processing circuit 113 is arranged to receive a signal produced from a frequency demodulation circuit 12 and is connected to a video mute control circuit 13. The output of the frequency demodulation circuit 12 is supplied to an A/D conversion circuit 116. The A/D conversion circuit 116 is arranged to receive a clock signal from an oscillation circuit 126. A memory 117 is arranged to receive a signal produced from the A/D conversion circuit 116 and to have its address controlled by an address signal coming from a memory controller 124. The memory 117 serves to expand the time base of an audio signal which is time-base compressed. A D/A conversion circuit 118 is arranged to convert the digital signal output of the memory 117 into an analog signal. The output terminal of the D/A conversion circuit 118 is connected to an audio signal processing circuit 119 which is arranged to reduce the noise of the audio signal. The output terminal of the audio signal processing circuit 119 is connected to an audio mute circuit 120. The audio mute circuit 120 is a circuit block which is arranged to perform a muting action under the control of a system controller 128 which will be described later. The output terminal of the mute circuit 120 is connected to a speaker 121. An information signal demodulation circuit 122 is arranged to receive a signal produced from the frequency demodulation circuit 12 and also a signal coming from a timing signal generating circuit 125 and to demodulate a control data signal which is provided for reproduction of an audio signal record contained in an audio signal record track. The demodulated data signal thus produced from the information signal is arranged to be supplied. to the system controller 128. A part of the demodulated data signal is also supplied to the timing signal generating circuit 125. A reproduced signal discrimination circuit 123 is arranged to receive the signal produced from the frequency demodulation circuit 12 and to find a reproduced signal to be a video signal or some other signal. The output of the discrimination circuit 123 is supplied to the system controller 128. A memory controller 124 is arranged to control a memory 117 which is provided for reading and writing an audio signal. The memory controller is a block including circuits for reading and writing control and address control over the memory. The timing signal generating circuit 125 is arranged to receive a PG pulse signal from a PG pulse oscillator 21 and the signal produced from the information signal demodulation circuit 122. The circuit 125 generates a timing signal and supplies it to the information signal demodulation circuit 122 and the memory controller 124. An oscillation circuit 126 is arranged to generate a signal which serves as a reference clock for the A/D conversion circuit 116 and the memory controller 124. Another oscillation circuit 127 is arranged to generate a signal and supplies it as a reference clock to the D/A conversion circuit 118 and the memory controller 124. The system controller 128 is arranged to control the whole system of the embodiment. A ROM 129 is arranged to store a program for control over the system controller. A RAM 130 is arranged to be used by the system controller 128 for reading and writing. An up-switch (or track-up switch) SW1 is arranged in the same manner as in the case of FIG. 1 to be used for shifting a magnetic head 3 toward a track located in an inner position on the magnetic disc 1. A down-switch (or track-down switch) SW2 is arranged to be used for shifting the head 3 toward a track located in an outer position on the disc 1. An audio reproduction mode switch SW3 is provided for selection of an audio signal reproducing mode.

Figure 11:
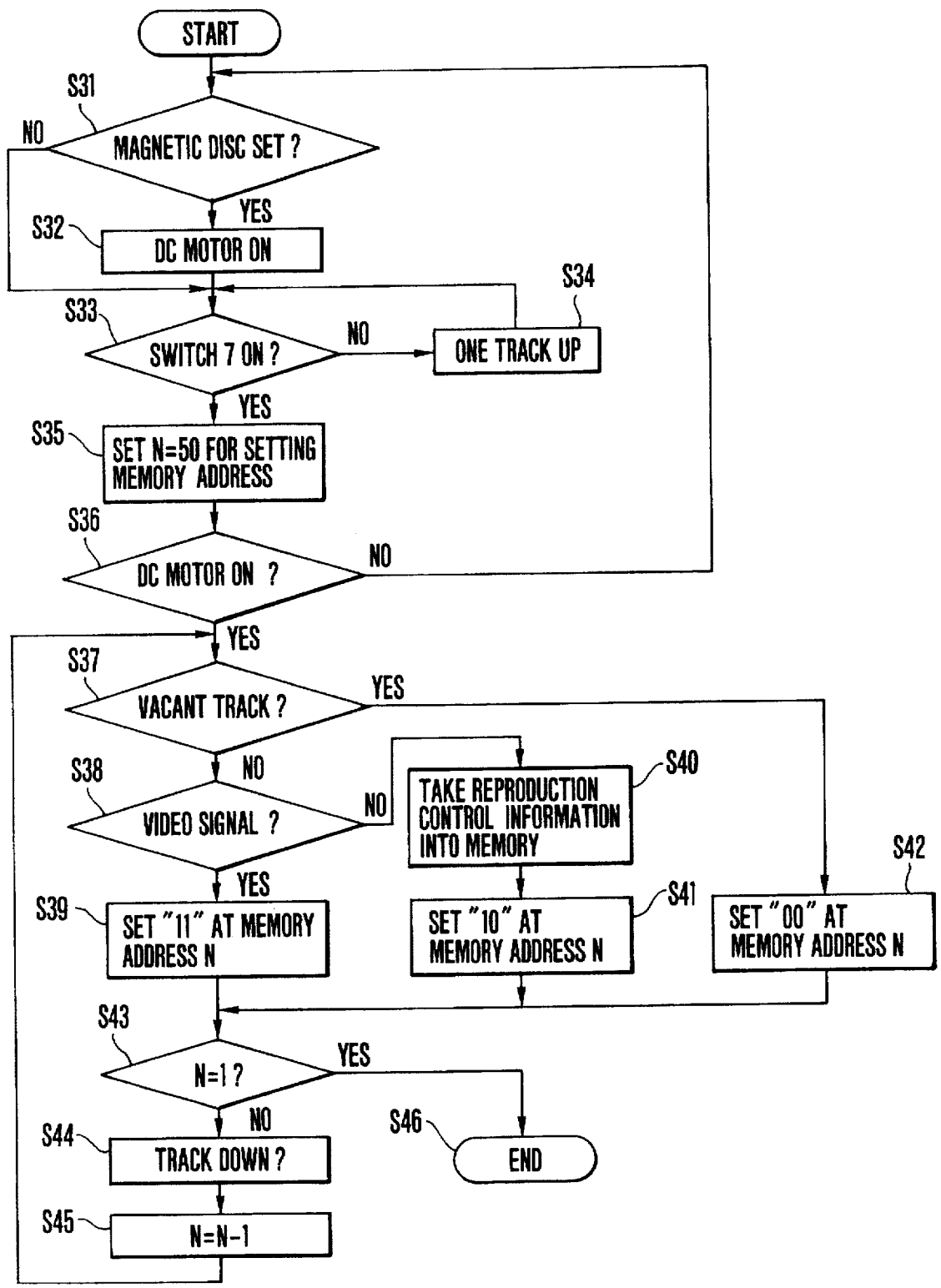

The operation of the embodiment shown in FIG. 10 is as described below with reference to flow charts showing the operation steps of the system controller 128:

FIG. 11 is a flow chart which shows a reproduction starting operation. The flow of operation of FIG. 11 will be described covering only the differing points of FIG. 11 from FIG. 2. In cases where the control data CD indicative of the time-base compression rate of an audio signal and a video signal track address corresponding to the audio signal is recorded in each of the audio signal record tracks and where the audio signal record is continuous over a plurality of tracks, information (or data) on the track address at which the audio signal record begins, ensuing audio signal record track addresses, etc., are taken into a table provided within the memory at a step S40 of the FIG. 11. Further, in the following description, an audio signal record extending over a plurality of tracks hereinafter will be regarded as one unit and called an audio signal sequence. Further, an audio signal record which comes to an end within a single track also will be called an audio signal sequence.

In storing the reproduction control data in the memory at the step S40 in the flow of FIG. 11, the control code data included in the four sectors of the audio record track mentioned in the foregoing is reproduced by the information signal demodulation circuit 122 and is read out by the system controller 128. The information signal demodulation circuit 122 is provided with the timing signal from the timing signal generating circuit 125 for demodulation of the control code data. Meanwhile, to the timing signal generating circuit 125 is supplied the PG pulse signal from the PG pulse generator 21. The data is demodulated in the following manner: When the start flag is detected for each of the four sectors on the basis of the PG pulse signal, a detection signal is sent from the information signal demodulation circuit 122 to the timing signal generating circuit 125. The circuit 125 then forms the timing pulse signal on the basis of the detection signal and sends the timing pulse signal for the demodulation of the control code data.

Next, the operation for actually reproducing a video signal from the magnetic disc 1 is as follows: When the magnetic disc 1 is set in place through the flow of operation shown in FIG. 11, data for the records contained in all the tracks from the 50th track to the first track formed on the magnetic disc 1 is automatically stored at the RAM 130. The flow of operation comes from a step S46 of FIG. 11 to a step S47 of FIG. 12. At the step S47: The address N within the RAM is checked for the data of "11" indicative of a video signal record track. If it is found to be the video signal record track, the flow proceeds to a step S48. At the step S48: The position of the switch SW3 is checked to find if the apparatus is set in the audio signal reproducing mode. If not, the flow proceeds to a step S49. At the step S49: A video signal muting state is cancelled and a reproduced video signal is allowed to be produced and supplied to the monitor. The flow then proceeds to a step S54 and comes to an end there. It should be noted that such a checking flow may be replaced by that shown in FIG. 6. In case that the apparatus is found at the step S48 to have been set in the audio signal reproducing mode, the flow of operation comes to a step S50. At the step S50: An audio reproduction sequence II which will be described later is executed. Then, the flow comes to a step S54 to end the operation. If the data of the address N within the RAM is found not "11" at the step S47, the flow comes to a step S51. At the step S51: The data of the address N of the RAM is checked to see if it is "10" for an audio signal record track. If not, the flow branches off to a step S54 to end the operation there. If it is found to be "10," the flow proceeds to a step S52. At the step S52: A check is made for the position of the switch SW3 which is provided for setting the apparatus in the audio signal reproduction mode. If the apparatus is thus found to be not in the audio signal reproduction mode, the flow comes to the step S54. In the case of the audio signal reproduction mode, the flow comes to a step S53 to have an audio reproduction sequence I executed in a manner as will be described later. After completion of execution of the audio reproduction sequence I, the flow proceeds to the step S54 to end the operation there.

Figure 13A:
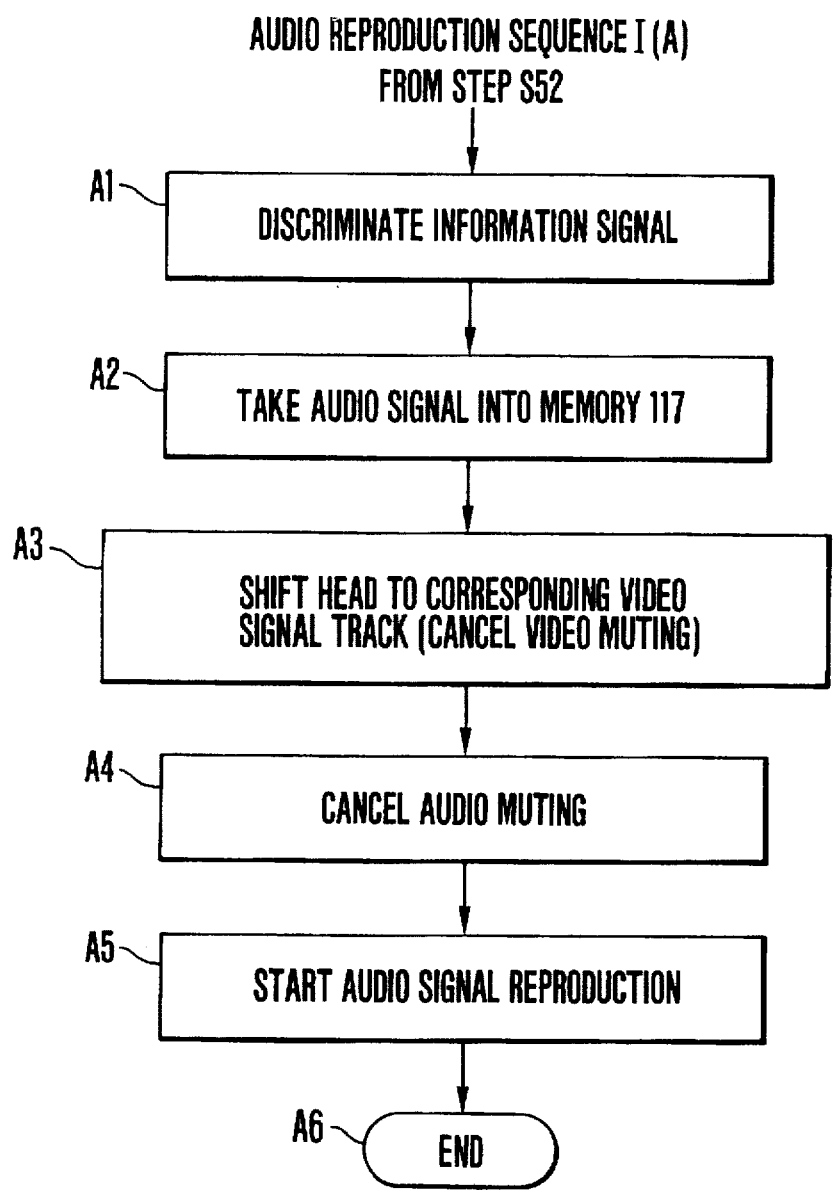
Figure 13B:
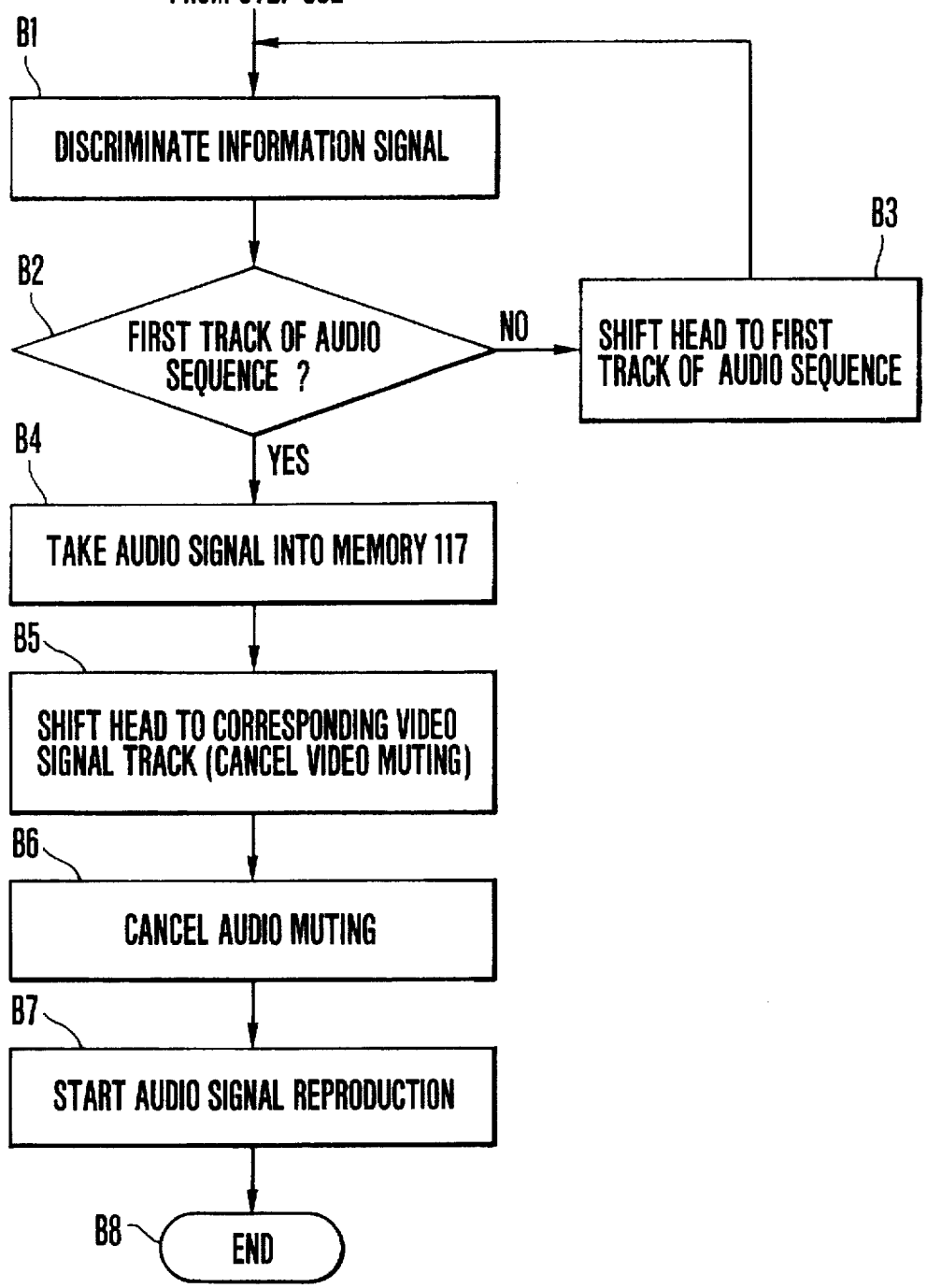

Referring now to FIGS. 13(a) and 13(b), the flow of operation for the above stated audio reproduction sequence I is as follows: In an audio reproduction sequence I (A) which is as shown in FIG. 13(a), the reproduction controlling data signal recorded in a currently accessed audio signal record track is detected at a step A1. At a step A2: The audio signal reproduced from the accessed track is taken into the memory 117. At a step A3: A track feeding action is performed according to the data which is included in the reproduction control data signal detected at the step A1 and is indicative of an applicable video signal record track address. Then, a video signal muting state is cancelled. The flow comes to a step A4. At the step A4: An audio signal muting state is cancelled. The audio signal stored at the memory is read out and the flow comes to a step A5. At the step A5: The read out audio signal begins to be reproduced.

FIG. 13(b) shows the flow of operation of an audio reproduction sequence I (B), wherein a reproducing action is performed beginning with the leader part (foremost part) of an audio sequence which includes the currently accessed audio signal record track (a track to which the head currently has access). At a step B1 of FIG. 13(b): A reproduction control data signal which is recorded in the currently accessed audio signal record track is discriminated. At a step B2: From the content of the data signal determination is made as to whether or not, the currently accessed track is the first of tracks included in an audio sequence. If the track is found to be not the first of them, the flow comes to a step B3. At the step B3: The head is caused to have access to the first track of the audio sequence consisting of tracks the track numbers of which are included in the reproduction control data signal. The flow then branches off to the step B1 to repeat the steps B1 and B2. Then, the flow comes from the step B2 to a step B4. At the step B4: The reproduced audio signal is taken into the memory. At a next step B5: The head is shifted to an applicable video signal record track in the same manner as at the above stated step A3. After that, an audio signal muting state is cancelled with a video signal muting state also cancelled. Then, audio reproduction begins. In taking the audio signal into the memory, the memory controller 124 of FIG. 1 is controlled by the system controller 128. At the same time, the A/D conversion circuit 116 operates according to the timing signal produced from the timing signal generating circuit 125 and the oscillation circuit 126, so that digital audio data can be taken into the memory 117. Following that, the system controller 128 causes the memory controller 124 to control a speed at which reading from the memory 117 is performed on the basis of the data signal indicative of the time-base compressed rate of the audio signal included in the audio reproduction control data. Then, a digital audio signal is read out from the memory according to the timing of the clock signal coming from the oscillation circuit 127. The digital audio signal thus read out is digital-to-analog (D/A) converted and is supplied to the audio signal processing circuit 119 to be subjected to the processes for noise reduction, etc. The audio signal which is thus processed is produced from a speaker 121 via an audio mute circuit 120. In accordance with the procedures of the audio reproduction sequence I (B) of FIG. 13(b), even in the event of reproduction of an audio signal record extending over a plurality of tracks with the head having access to one of these tracks located at a part halfway in the audio signal record when an instruction for reproduction is received, the audio signal record can be automatically reproduced from the beginning thereof. This arrangement makes the contents of the record adequately understandable.

Referring to FIG. 14, the audio reproduction sequence II is as follows: At a step C1: The audio signal reproduction control data signal is discriminated. Before coming to the flow of operation shown in FIG. 14, at least the audio signal reproduction control data signal has been completely read out at the step S40 of FIG. 11. The data for correlating the audio record track addresses with corresponding video signal record track addresses are thus stored within the RAM. At the step C1, the reproduction control data signal stored within the RAM is checked for obtaining data of the audio signal track address corresponding to a currently accessed video signal record track. At a step C2: While the video signal is muted, a track feeding action is performed to cause the head to have access to a corresponding audio signal record track. At a step C3: The reproduced audio signal is taken into the memory. Step C4: Again the head is caused to have access to a video signal record track corresponding to the above stated audio signal record track. A video signal muting state is cancelled. The flow proceeds to a step C5. At the step C5: An audio signal muting state is cancelled. At a step C6: Audio signal reproduction begins. Step C7: The flow of operation comes to an end. The audio signal is then reproduced in the same manner as mentioned in the foregoing.

In the still video signal recording format which is generally employed, the track number of a corresponding video signal track is recorded within each audio signal recording track. However, no reverse prescription has been provided. Therefore, when a currently accessed reproducing track is a video signal record bearing track, it has been impossible to reproduce an audio signal record from an audio signal track corresponding to the video signal track. Whereas, in accordance with the arrangement of the embodiment, the corresponding audio signal record is reproducible.

Figure 15A:
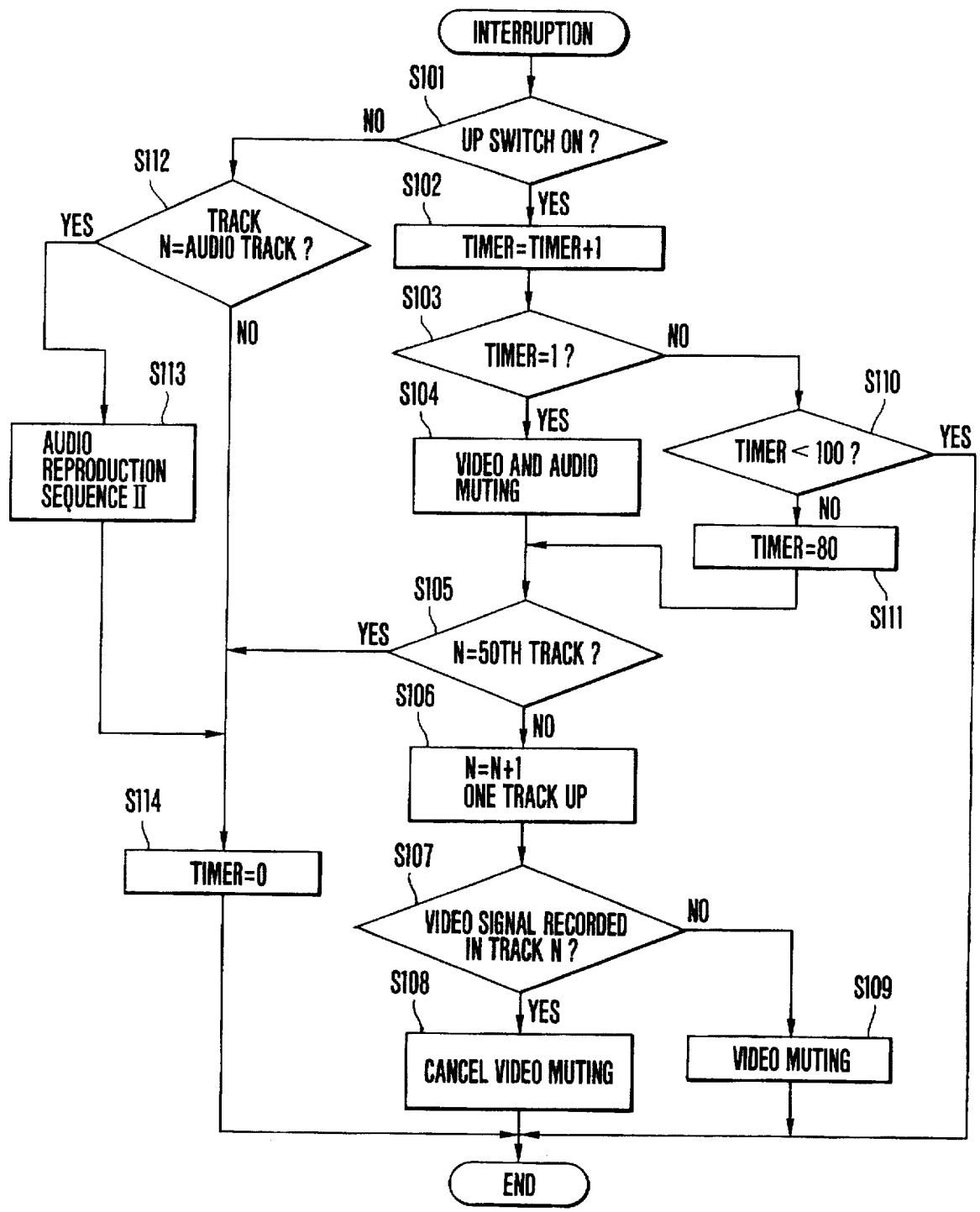
Figure 15B:
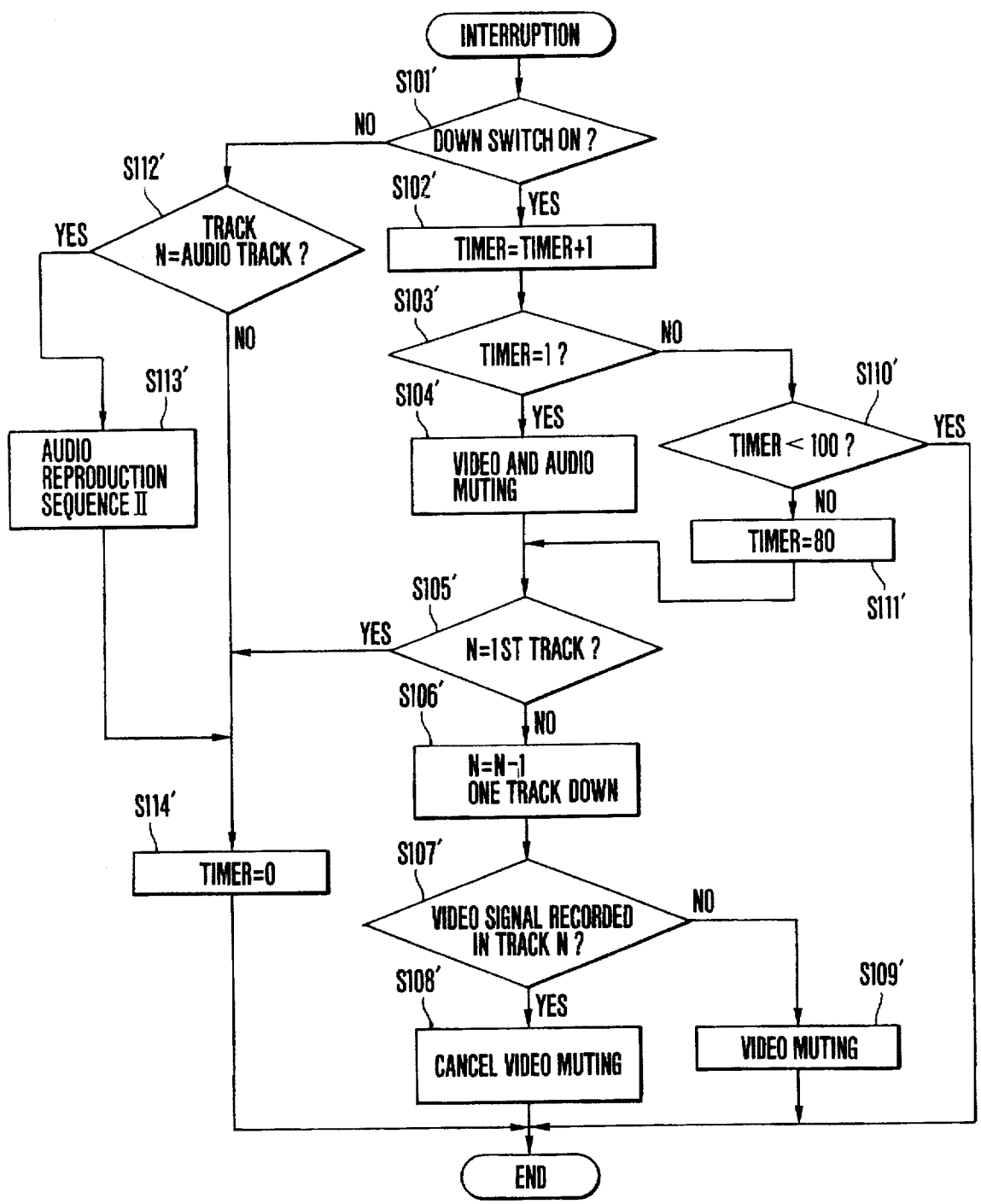
Figure 15B:
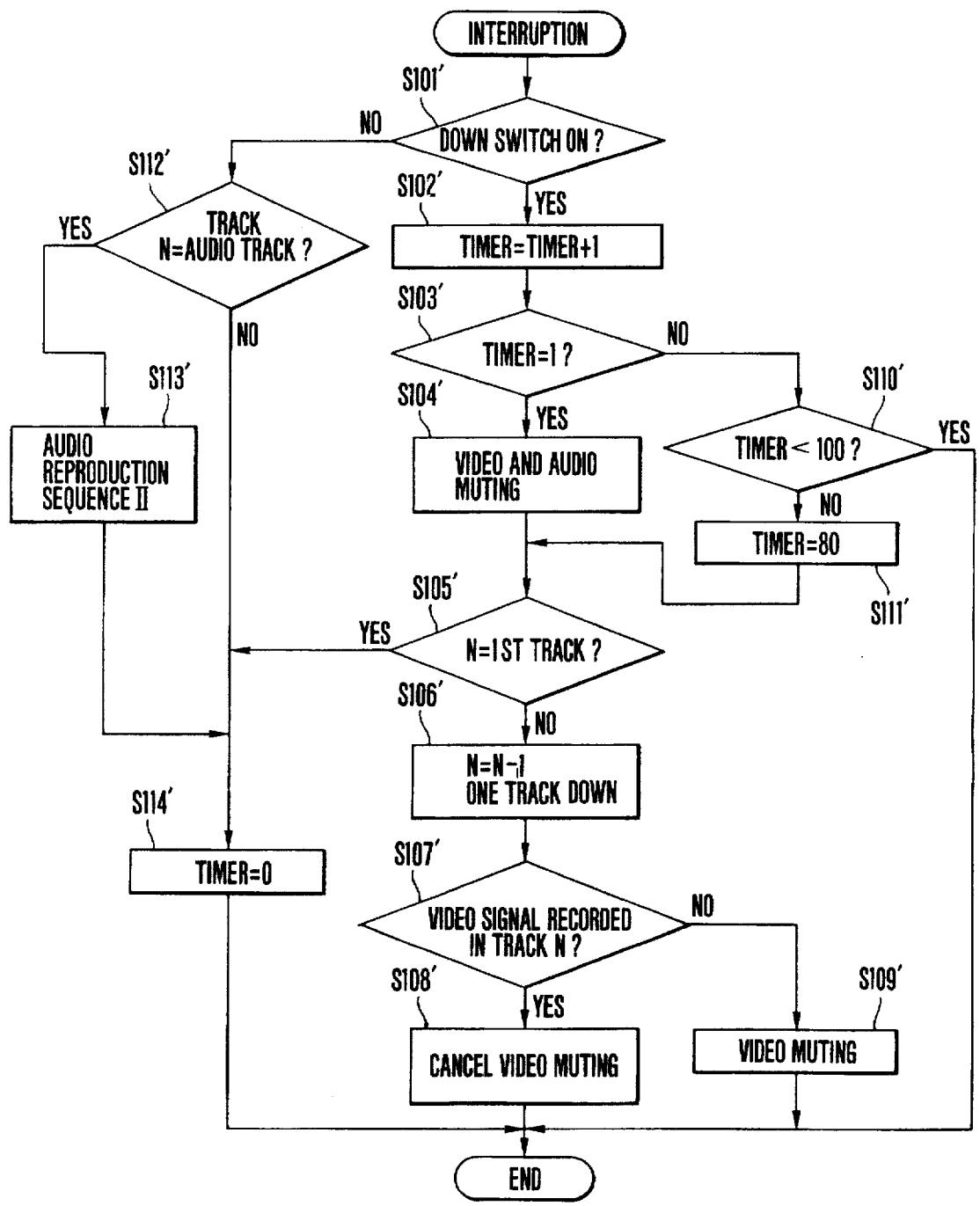

Referring to FIGS. 15(a) and 15(b), the sequence of reproduction from tracks under the operations of the up- and down-switches SW1 and SW2 of FIG. 10 is as follows: The embodiment is assumed to have been set in the audio signal reproducing mode by means of the switch SW3. The flow chart of FIG. 15(a) shows a program to be executed by timer interruption every 10 msc against each of the flows of operation described in the foregoing.

At a step S101 of FIG. 15(a): The up-switch SW1 is checked. If the switch SW1 is found on (i.e. in an on-state), the flow of operation proceeds to a step S102. Step S102: A value "1" is added to the counted value of a timer which is included in the system controller 128. Step S103: The counted value of the timer is checked to see if it is "1". If so, the flow proceeds to a step S104. Step S104: Video and audio signals are muted. Step S105: A currently accessed track is checked to see if it is the 50th track. If not, the flow proceeds to a step S106. Step S106: A value "1" is added to the value of the track address data N. The track-up action is performed by one track. Step S107: The newly accessed track is checked to see if it is a video signal record track. If so, the flow proceeds to a step S108. Step S108: The video signal muting state is cancelled. If the accessed track is found to be not a video signal record track at the step S107, the flow comes to a step S109 to have a video muting action performed there. At a step S110: The counted value of the timer is checked to see if it is smaller than 100. The counted value 100 of the timer indicates that the up-switch SW1 has continued in its on-state for one sec. If the timer value is found to be not smaller than 100, the flow proceeds to a step S111. At the step S111: The timer is set at 80. After that, therefore, the timer counts 20 from 80. Then, when the counted value of the timer reaches 100, the flow comes to the step S105. Therefore, after the up-switch SW1 is continuously left in its on-state over a period of one sec, the track feeding action is resumed every 0.2 sec. Further, when the up-switch SW1 is found to be no longer in its on-state at the step S101, the flow comes to a step S112. At the step S112: The currently accessed track is checked to see if it is an audio signal record track. If so, the flow proceeds to a step S113 to execute the flow of the audio reproduction sequence. If not, the flow comes to a step S114. At the step S114, the counted value of the timer is set at "0" and the flow of operation comes to an end.

In other words, with the up-switch SW1 operated during the process of sound or audio (signal) reproduction, the audio reproduction is inhibited at least while the up-switch SW1 is in its on-state, i.e. during a fast track feeding action. Then, the fast feeding action is performed at a given speed and repeated for every track. Further, in case that a first accessed track after the up-switch SW1 is turned off is an audio signal record track, the audio signal is reproduced by executing the flow of audio reproduction sequence. The operation to be performed with the down-switch SW2 turned on is similarly describable. In that instance, the flow of operation is as shown in FIG. 15(b). The flow of FIG. 15(b) differs from that of FIG. 15(a) in the following points: At a step S101', a check is made for the position of the down-switch SW2. At a step S105', a check is made for a state of N=1. At a step S106', the value of data N is decremented by one (N=N−1) and a track-down action is performed by one track. With the exception of these points, the flow of FIG. 15(b) which relates to the operation of the down-switch SW2 is the same as that of FIG. 15(a) which relates to the operation of the up-switch SW1. Therefore, the following description of the flow charts covers only the flow relative to the operation of the up-switch SW1 while the difference of the flow relative to the operator of the down-switch SW2 is similar to the difference described above.

FIG. 16 shows in a flow chart an embodiment of the invention which is arranged to control a track shifting action in such a way as to cause the head to have access only to video signal record tracks during a fast feeding process performed by operating the up-switch SW1. In other words, the embodiment performs a track shifting sequence in a reproducing mode in which priority is given to a video signal.

The flow of FIG. 16 is arranged, like in the case of flows shown in FIGS. 15(a) and 15(b), to execute a flow of operation by effecting timer interruption every 10 msc. The steps of FIG. 16 which are the same as those shown in FIG. 15(a) are omitted from description. Referring to FIG. 16, the up-switch SW1 is checked to see if it is in an on-state at a step S201. If so, the flow proceeds to a step S202. Step S202: A value "1" is added to the counted value of the timer. Step S203: The timer is checked to see if its counted value is 1. If so, the flow proceeds to a step S204. Step S204: A currently accessed track is checked to see if it is the 50th track. If not, one is added to the data N and the track-up action is performed to the extent of one track. The flow then comes to a step S206. At the step S206: The counted value of the timer is checked to see if it is 80. The step S206 is provided for the purpose of finding whether the apparatus has been brought into the fast feeding mode of 0.2 sec by a continuous on-state of the up-switch SW1. Arrival of the counted value of the timer at 80 indicates entrance into the fast feeding mode. If the apparatus is thus found not to have assumed the fast feeding mode at the step S206, the flow proceeds to a step S207. Step S207: The video signal is muted and the flow comes to an end. In case that the fast feeding mode is found to have been assumed at the step S206, the flow comes to a step S208. At the step S208: The currently accessed track is checked to see if it is a video signal record track. If not, the flow proceeds to a step S209. At the step S209: The video signal is muted. The flow then comes back to the step S204 to repeat the above stated steps.

If the accessed track is found to be a video signal record track at the step S208, the flow comes to the step S207 to have the video signal muting state cancelled. In other words, in the case of this flow chart, the head is arranged to have access only to video signal record tracks when there obtains the fast feeding mode with the up-switch SW1 continuously pushed or operated. Then, the track feeding action is performed at intervals of time determined by the timer. During the track shifting process, tracks other than the video signal record tracks are skipped, so that the video signal is alone allowed to be supplied to the monitor with the up-switch SW1 continuously operated. Therefore, the audio signal can be prevented from being reproduced as noises during fast feeding.

In the case of this flow, the step S211 enables the embodiment to be released from the video signal muting state at the step S207 without coming to the step S208 only when the track-up action is performed for the first time. This enables the record of a track other than the video signal record track to be produced and supplied to the monitor. However, in order to ensure that the head comes to have access only to a video signal record track whenever the track-up action is performed, the flow is arranged always to branch off at the step S206 to the step S208. That arrangement enables the track-up action to limit the reproducing tracks to the video signal record tracks.

Audio Preference Reproduction Mode—No. 1

Figure 17:
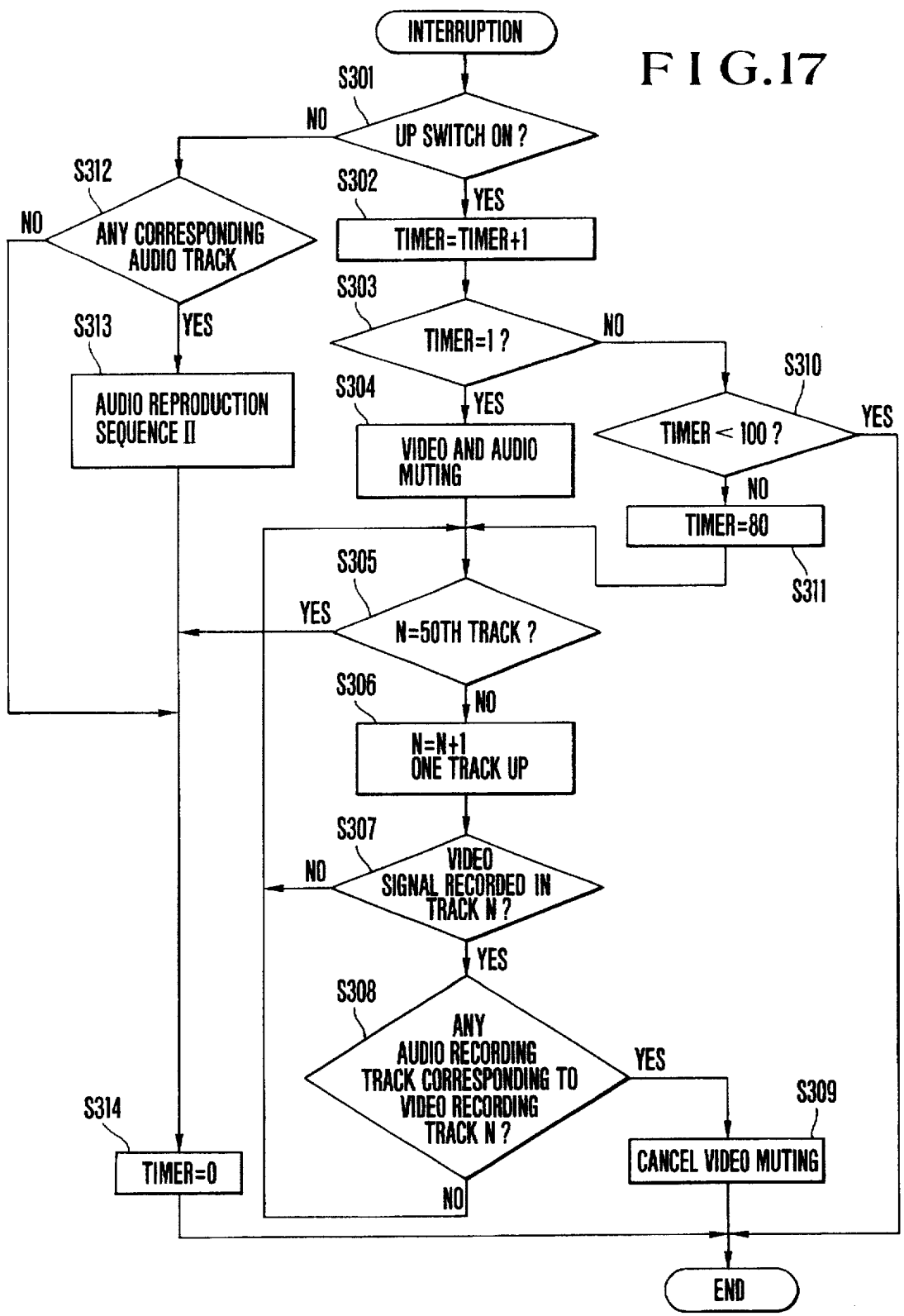

FIG. 17 is a flow chart showing a sequence of steps, wherein the head is shifted by the operation of the up-switch SW1 only to such video signal record tracks that have corresponding audio signal records. In this case, the video signal record of any video signal record bearing track that has no corresponding audio signal record bearing track is not reproduced. In other words, the track feeding sequence is carried out by giving priority to the audio signal record bearing tracks. The flow of FIG. 17 is performed, like the flows of FIGS. 15(a), 15(b) and 16, by timer interruption of 10 msec. The steps of FIG. 17 which are similar to those of FIGS. 15(a), 15(b) and 16 are omitted from description.

Referring to FIG. 17, when the track feeding action is performed at a step S306, the flow proceeds to a step S307. At the step S307: An accessed track is checked to see if it is a video signal record track. If so, the flow proceeds to a step S308. At the step S308, a check is made for the presence of an audio signal record track corresponding to the video signal track. If there is a corresponding audio signal record track, the flow proceeds to a step S309. If the accessed track is found to be not a video signal record track at the step S307, the flow comes back to the step S305 to repeat the track-up action. Further, if no corresponding audio signal record track is found at the step S308, the flow branches off to the step S305 to repeat the one-track-up action. In short, the flow comes to the step S309 only in cases where the accessed track is a video signal record track which has a corresponding audio signal record track.

Audio Preference Reproduction mode—No. 2

Figure 18:
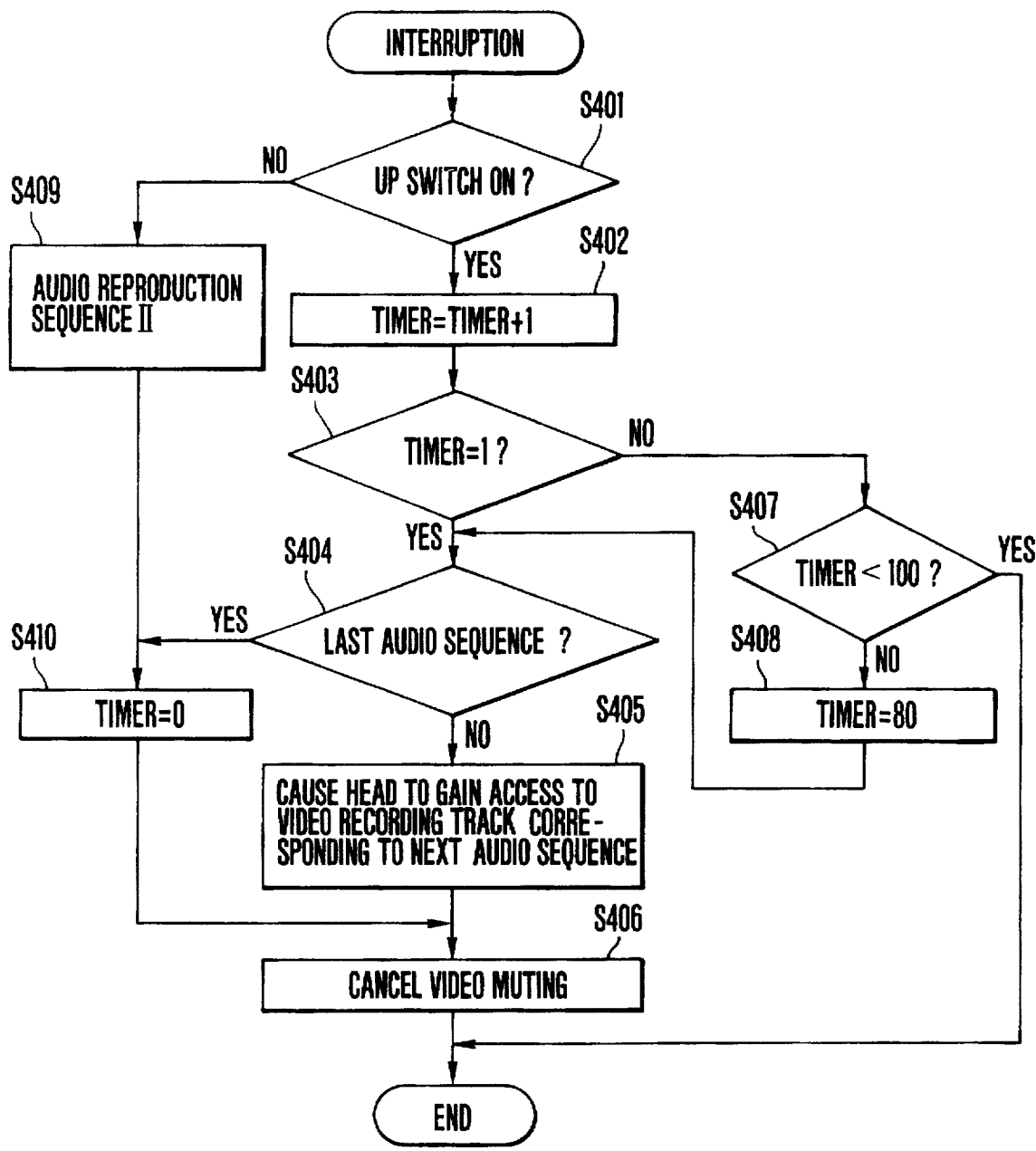

FIG. 18 shows in a flow chart an embodiment of the invention which is arranged to effect a change from one audio reproduction sequence over to another by the operation of the up-switch SW1. In some cases, one audio signal sequence, i.e., one block of an audio signal, can be recorded within one and the same track. In other cases, the record of one block of audio signal cannot be contained within one single track and extends over a plurality of tracks. Each of these blocks of audio signal is referred to herein as an audio signal sequence. In the case of FIG. 18, the embodiment is arranged not only to shift the head from a currently accessed track to an adjoining track but also to reproduce the audio signal of a next audio signal sequence which is other than an audio signal sequence currently in the process of reproduction.

Further, in proceeding to the next sequence, the head first comes to a video signal record track corresponding to the first of the tracks included in the audio signal sequence. The flow chart of FIG. 18 is based on the assumption that at least the reproduction control signals of the audio signal record tracks formed on the magnetic disc has been completely read out. At least the track address data of a video signal record track which corresponds to the first of audio signal record tracks included in each audio signal sequence is assumed to have been stored at the RAM 130 shown in FIG. 10.

Referring to FIG. 18, the flow of operation proceeds from a step S401 to steps S402 and S403 one by one according to the operation of the up-switch SW1. At the step S403, the timer is checked to see if its counted value is 1. If not, the flow proceeds to a step S404. At the step S404, a currently reproducing track is checked to see if it belongs to the last of the audio signal sequences recorded on the magnetic disc, i.e., an audio signal sequence recorded in the innermost part of the disc. The discrimination of position of the record track between the outer position and the inner position on the disc is made on the basis of the position of the foremost track of the audio signal sequences. If the currently reproducing track is found to belong to the innermost audio signal sequence at the step S404, the currently reproducing audio signal sequence is the last of the sequences and the flow comes to a step S410. If not, the flow proceeds to a step S405. At the step S405: The head is caused to have access to a video signal record registered as the reproduction control data signal of the foremost audio signal record track of a next audio signal sequence which is located on the inner side. In this instance, the content of the audio reproduction control data (signals) stored at the RAM 130 is used as reference. Following this, the flow proceeds to a step S406. Step S406: A video signal muting state is cancelled. Further, when the up-switch SW1 is turned off, the flow comes from the step S401 to a step S409. At the step S409: Audio signal reproduction begins with the flow of the audio reproduction sequence executed.

In other words, the operation of the up-switch SW1 performed at that time can be regarded as switching to a next audio signal sequence.

While FIG. 18 shows by way of example the switch-over operation performed on the audio signal sequence by means of the up-switch SW1, such switch-over can be also performed by means of the down-switch SW2 like in the cases of FIGS. 16 and 17. However, the details of such arrangement are omitted herein.

In accordance with the arrangement of the embodiment shown in FIG. 18, one audio (signal) sequence can be simply switched over to another by just operating either the up-switch SW1 or the down-switch SW2. It is another advantage of the embodiment that, at the time of the switch-over, the foremost signal record is reproduced, so that the efficiency of the operation can be greatly improved over the method of merely shifting the head to a next track.

Further, in the foregoing description of embodiment, the audio preference reproduction mode—No. 1, the audio preference reproduction mode—No. 2 and the video preference reproduction mode are described as discrete arrangements. However, a single apparatus can be arranged to be capable of selecting any of these modes by means of a selection switch as desired.

Further, if an A/D converter and a field (or frame) memory are arranged as indicated with broken lines in FIG. 10, the embodiment becomes capable of preventing the reproduced video signal from dropping off during a video signal muting period by virtue of the arrangement to temporarily store at the memory the video signal to be supplied to the monitor. In this case, the video signal is arranged to be written into the field memory at the timing which is the same as that of the step at which the video signal muting action or the cancellation thereof is performed as shown in the flow charts described. For this purpose, a step for writing the video signal is provided in place of the video signal muting step or the muting cancelling step. Therefore, until a video signal writing action is performed, a video signal which has previously been written into the memory is read out from the memory and is supplied to the minitor. At the timing of the cancellation of muting, a video signal is newly written into the memory. Incidentally, it goes without saying that the reading action from the memory is continuously performed at the video rate.

Further, in case that the above stated field memory is not included in the embodiment, a drop-out would take place during the video signal reproduction by the video signal muting action performed when the head has access to an audio signal record track. In that case, the embodiment is provided with an addition circuit which is arranged subsequent to the video muting control circuit 13, as indicated with a broken line in FIG. 10, to produce a sum signal obtained by adding a video signal produced from a character generator to the output of the video muting control circuit. While the head is located over an audio signal record track, the monitor may be caused to make a display reading, for example, "audio signal being taken in" by means of the character generator.

In accordance with the arrangement of the embodiment, as described in the foregoing, the audio signal and the video signal are separately recorded in different tracks. Even if the audio signal record tracks and the video signal record tracks are commingled, the starting timing of audio signal reproduction becomes clear, because: the reproducing action on the audio signal record track is performed after an operation on a selective track shift instructing switch is found to have come to an end. Therefore, the reproducing apparatus according to the invention excels in operability for a magnetic disc on which the video and audio signals are recorded in a commingled state.

Further, each of the above stated reproduction modes is advantageous for a specific purpose. Therefore, the embodiment which is arranged to be capable of carrying out reproduction in any of these different modes by just operating the up- and down-switches excels in operability.

In accordance with the arrangement of the embodiment described in the foregoing, audio signal reproduction is carried out when no renewal of the reproducing position is instructed by means of an operation part. This is an advantage in terms of operability.

Figure 19:
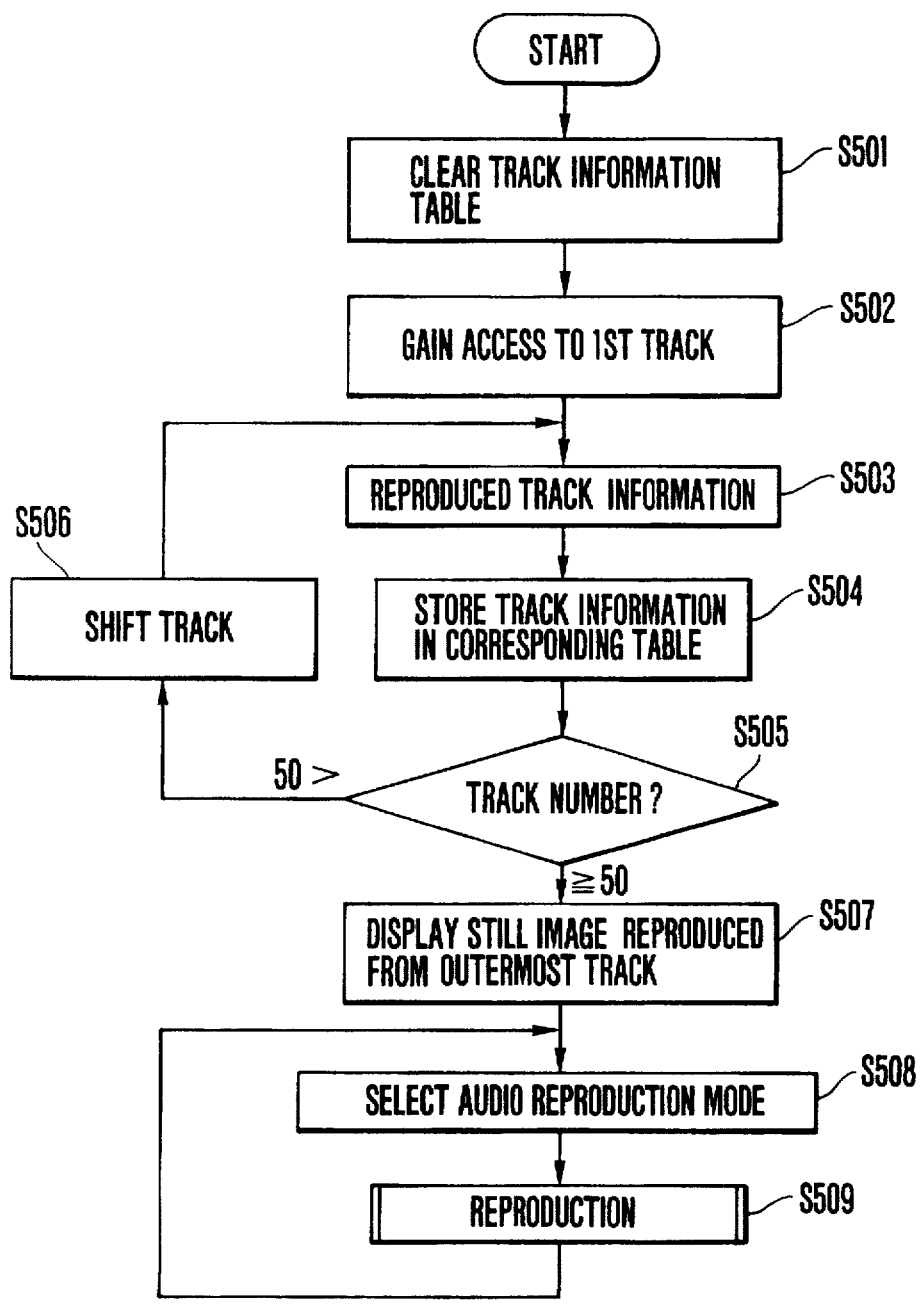

A further embodiment of this invention which is a modification of the embodiment shown in FIG. 10 is provided with a stop switch STSW, a mode setting switch MDSW and an interval time setting switch INTSW as indicated by broken lines in FIG. 10 in addition to the components and parts described in the foregoing. These additional parts enable the embodiment to have additional functions, which will be described below with reference to FIGS. 19, 20 and 21 which are flow charts and tables:

The arrangement of this embodiment is, as mentioned above, similar to that of the apparatus shown in FIG. 10 and, therefore, is omitted from the following description, which covers the operation of the system controller 128 of the embodiment with reference to flow charts. In the beginning of the operation, the system controller 128 detects the presence or absence of a video or audio signal record in each of the tracks formed on the magnetic disc 1 in the same manner as in the case of the flow chart of FIG. 11. This initial operation is as shown in a flow chart in FIG. 19. Referring to FIG. 19, at a step S501, an area provided within the RAM 130 for storing data about tracks is cleared. At a step S502: The head 3 is allowed to have access to the first track of the disc (video floppy disc). If the accessed track is a video signal record track, a discrimination is made between a frame type record and a field type record. If the track is an audio signal record track, data or information contained in the track about the track number of the foremost track of the audio sequence, the track number of a corresponding video signal record track, etc., are reproduced and obtained by means of the information signal demodulation circuit 122 at the step S503. At a step S504: The data thus obtained is stored at applicable parts of a table provided within the RAM 130. Step S505: A check is made for the track number of the currently accessed track. Steps 503, S504, S505 and S506: The above stated actions are repeated for all the tracks formed on the disc.

An information table is thus prepared for each of the record tracks formed on the video floppy disc (or a magnetic disc). Upon completion of the table, the track number of a video signal record track located in the outermost part of the disc is drawn out from the track information table. Step S507: A still picture obtained from the outermost video signal record track is displayed on the monitor 15.

Steps S508 and S509: When the audio reproduction mode is selected by means of an operation panel switch or a remote control switch, a reproducing operation begins and a reproduction routine is executed.

Figure 20:
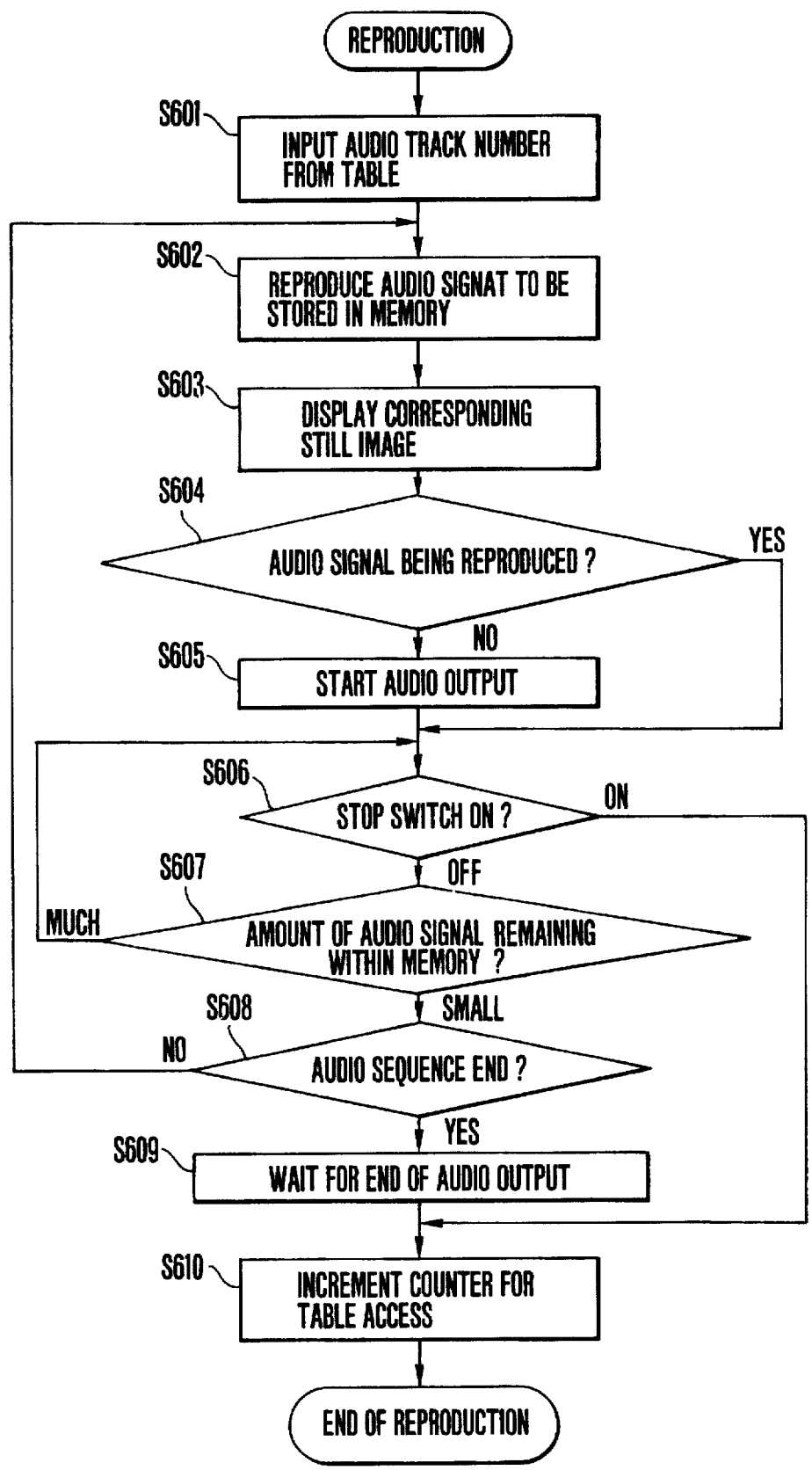

The reproduction routine is as shown in FIG. 20. Referring to FIG. 20, the track number of the foremost audio signal record track of the audio sequence to be reproduced is drawn out from the above stated track information table prepared within the RAM 130 at a step S601. Step S602: The audio signal record of the track is reproduced and stored at the memory 17. Step S603: The head is shifted to a still image record track which corresponds to the above stated audio signal record track by means of a head shifting device and the head driving motor 5. The image thus obtained from the track is reproduced and displayed. Step S604: A check is made for audio signal reproduction. If the audio signal is not produced, that is, if no audio information is read out from the memory 117, the flow comes to a step S605. At the step S605: The audio signal begins to be produced. Step S606: The stop switch STSW checks to see if it is in an on-state. If so, the flow branches off to a step S610. If not, the flow proceeds to a step S607. A check is made for the amount of the audio signal remaining within the memory 117. When the remaining amount of the audio signal becomes insufficient requiring reproduction of the audio signal record of another track, the flow comes to a step S608. At the step S608: A check is made to find whether the audio sequence is continuing or not. If the audio sequence is found to be still continuing, the steps of flow from the step S602 are repeated.

If the audio sequence is found not continuing at the step S608, the flow proceeds to a step S609. At the step S609: The flow waits for the completion of the audio output without shifting to a next sequence. Step S610: A counter which is provided for access to the table is incremented for reproduction of the next audio signal sequence. The flow of operation shown in FIG. 20 is thus completely executed. The system controller 128 then waits for a next input of mode instruction as shown at the steps S508 and S509.

The audio signal record track number to be obtained from the table at the step S601 is arranged in the following manner: The description given above is on the assumption that the record track located in the outermost position of the video floppy disc (or the magnetic disc) has the highest priority. For reading at the step S601, the table is prepared in varied manners for the following different reproduction modes:

1) An audio sequence preference mode (a first mode): Reproduction is performed beginning with the foremost track of an audio sequence located in the outermost position.

2) A video track preference audio sequence reproduction mode (a second mode): Reproduction begins with a video signal record track corresponding to the foremost track of each audio sequence.

The details of the first and second modes are as described below with reference to FIGS. 21(a) to 21(c):

FIGS. 21(a) to 21(c) show whether each track has a video signal record or an audio signal record; if it is a video signal record track, they show to which of the audio signal record tracks it corresponds; and, if it is an audio signal record track, to which of the audio sequences it belongs. Referring to FIG. 21(a), a line A/V indicates video signal record tracks with a symbol V and audio signal record tracks with symbols of small alphabetical letters. The small alphabetical letter symbols are used in the alphabetical order beginning with "a". The same small alphabetical letter is used for the same audio sequence and is followed by numeral suffixes, which are arranged in the order of reproduction within the same audio sequence. Each of lines "audio sequence 1" and "audio sequence 2" shows the audio signal record tracks at corresponding video signal record tracks. In the line of "audio sequence 1," the audio signal record tracks of the audio sequence 1 having corresponding video signal record tracks are indicated by the same reference symbols a1, a2, etc., as in the line A/V. For example, a track No. 2 has a video signal record and corresponds to an audio signal record track b1 which is, in this instance, a track No. 13.

With the data of each track recorded on the video floppy disc as shown in FIG. 21(a), the track number data is reproduced from a table as mentioned at the above stated step S601. This table is as shown in FIG. 21(b). Referring to FIG. 21(b), in a part "track No.", the track numbers of the tracks to which the head 3 is having access are written in the order of access from the left to the right in different manners according to different modes of reproduction. FIG. 21(c) shows the track numbers of the tracks in the order of shifting the head for reproducing the video signal with reproduction performed with reference to the FIG. 21(b). In a first mode, i.e., a mode (1), for example, the track No. 11 is first reproduced. Since this track bears the audio signal record, the head 3 is shifted to the 11th track to reproduce the audio record. The reproduced audio signal is written into the memory 117. Following this, the video signal record of the fourth track which corresponds to the 11th track is reproduced. Then, the audio signal written into the audio memory 117 is read out and is reproduced simultaneously with the video signal of the fourth track. After that, according to a decrease in the contents of the audio memory 117, the head 3 is shifted to the 12th track to reproduce its audio signal record to write it into the memory 117. Then, the head 3 is shifted to the seventh track which has a video signal record corresponding to the audio signal record of the 12th track. The video and audio signal reproduction is thus carried on in the same manner for ensuing tracks arranged as shown in FIGS. 21(b) and 21(c). In a second mode, i.e., a mode (2), if there are plurality of audio sequences, one of the sequences having its foremost track correlated with a video signal record tracks located in the outermost position among others is first reproduced. In other words, referring again to FIG. 21(a), the foremost tracks of the audio sequence indicated by symbols "a" and "b" are related respectively to the fourth and second tracks which are bearing video signal records. In the case of the second mode, therefore, the audio sequence "a" is first reproduced and is followed by the sequence "b."

In the first and second modes, any video signal record that has no correlated audio signal record is skipped and omitted from reproduction. Such being the arrangement, the embodiment is capable making sound reproduction from a speaker simultaneously with images. This is an advantage in terms of operability.

There are other modes in which the video signal records which are skipped in the first and second modes can be reproduced in series. These modes are as follows:

A third mode, or mode (3): In addition to the operation performed in the first mode, priority is given to a video signal record of a track which has no corresponding audio signal record in shifting the head from the outermost side of the disc for reproduction. After that, the first mode is carried out. An example of operation in the third mode is as described below:

In this case, the video signal records of the first and third tracks which have no corresponding audio signal record tracks are first reproduced. The second track, in this case, has a video signal record corresponding to an audio sequence to be reproduced in the second place and is therefore skipped. Next, the records of a series of tracks belonging to the audio sequence related to the video signal record of the fourth track are reproduced along with the video signal record. After completion of reproduction of this audio sequence, an audio sequence related to the video signal record of the second track is reproduced along with the video signal record.

A fourth mode, or a mode (4): The operation in this mode is similar to the third mode with the exception of that it corresponds to the second mode. The details of it are, therefore, omitted from detection. In the fourth mode, the track number of a video signal record track corresponding to the foremost track of each audio sequence is compared with the track number of another video signal record track having no corresponding audio signal record and the video signal records are reproduced from the track of a smaller track number.

Further, in the third and fourth modes, the head is automatically inhibited from being shifted at the timing of stop marks "♩" and is kept in that state until the up-switch SW1 or the down-switch SW2 is operated. However, in fifth and sixth modes, or modes (5) and (6), the shift of head is never inhibited like in the third and fourth modes. In other words, in the fifth and sixth modes, the access position of the head is automatically renewed at preset time intervals.

The embodiment described is thus arranged to look up data for each track beforehand, to store it and to perform reproduction in one of various predetermined modes. The arrangement enables the embodiment to adequately reproduce the whole record even in the event of a record bearing medium having audio and video signals recorded thereon in a commingled state.

An advantageous feature of the embodiment also resides in the procedures of reproduction in the first to sixth modes described.

The embodiment described is arranged to use a disc-shaped record bearing medium. However, the usable medium is not limited to that kind. A tape-shaped or card-shaped medium shown in FIG. 9(a) or 9(b) is likewise usable for the embodiment. Further, the medium may be a solid-state memory such as a semiconductor memory.

The arrangement of this embodiment, as described in the foregoing, is capable of adequately reproducing signals even from such a medium that has a plurality of audio sequences, each consisting of records of a signal which continues timewise over a plurality of tracks, because these audio sequences can be serially reproduced according to the track number assigned to the foremost track of each audio sequence.

What is claimed is:

1. A reproducing apparatus for reproducing a signal from a plurality of different areas of a recording medium on which a plurality of video signals and a plurality of audio signals corresponding to said plurality of video signals are respectively recorded, comprising:

a) reproduction means for reproducing a signal from said plurality of different areas of said recording medium on which the signals are respectively recorded;

b) reproduction mode designating means having a first reproduction mode wherein groups of the video signals and the audio signals corresponding to said video signals having respectively been recorded on the plurality of different areas of the recording medium, are successively reproduced and having a second reproduction mode wherein the video signals having been recorded on the plurality of different areas of the recording medium are successively reproduced whereas said audio signals corresponding to some of said video signals are not reproduced, for designating either one of said first reproduction mode and said second reproduction mode to said reproduction means;

c) detection determining means for detecting an area recorded with a video signal from among the plurality of different areas on the recording medium, and determining whether said video signal recorded on the detected area is one of the video signals whose corresponding audio signal is recorded on other area than said area to be detected; and d) control means for controlling the reproduction means so as to detect by said detection determining means, when the first reproduction mode is designated by said reproduction mode designating means, areas recorded with the video signals whose corresponding audio signals are recorded on other areas then said areas to be detected, among all the video signals recorded on the plurality of different areas of the recording medium, reproduce the audio signals recorded on said other areas which correspond to said video signals recorded on the detected areas, store temporarily the reproduced audio signals, then reproduce from the recording medium the video signals corresponding to said audio signals stored temporarily, and to output thereby the video signals thus reproduced along with the audio signals stored temporarily, and to detect by said detection determining means, when the second reproduction mode is designated by said reproduction mode designating means, areas recorded with the video signals alone from among the plurality of different areas on the recording medium, and to reproduce successively said video signals recorded on the detected areas.

2. An apparatus according to claim 1, wherein the video signal indicate a picture image of a screen.

3. An apparatus according to claim 1, wherein the recording medium includes a disk-shaped recording medium.

4. An apparatus according to claim 1, wherein the reproduction mode instruction means includes a mode selection switch for selecting the first reproduction mode and the second reproduction mode, which are operated by an operator.

5. An apparatus according to claim 1, wherein the video signals recorded on the different areas of the recording medium in the second reproduction mode are successively reproduced at a predetermined period for reproduction.

6. A reproducing apparatus for reproducing a signal from a plurality of different areas of a recording medium on which a plurality of audio signals, a plurality of first video signals corresponding to said plurality of audio signals and a plurality of second video signals inconsistent with said plurality of audio signals are respectively recorded, comprising:
   a) reproduction means for reproducing a signal from said plurality of different areas of said recording medium on which the signals are respectively recorded;
   b) reproduction mode designating means having a first reproduction mode wherein groups of an the audio signals and the first video signals corresponding to said audio signals, having respectively been recorded on said plurality of different areas of the recording medium, are successively reproduced whereas said second video signals inconsistent with any of said audio signals are not reproduced and having a second reproduction mode wherein said second video signals inconsistent with any of said audio signals are successively reproduced whereas said first video signals corresponding to some of said audio signals are not reproduced, for designating either one of said first reproduction mode and said second reproduction mode to said reproduction means;
   c) detection determining means for detecting an area recorded with a video signal from among the plurality of different areas on the recording medium, and determining whether the video signal recorded on the detected area is a first video signal or a second video signal; and
   d) control means for controlling the reproduction means so as to detect by said detection determining means, when the first reproduction mode is designated by said reproduction mode designating means, areas recorded with the first video signals among all the video signals recorded on the plurality of different areas of the recording medium, reproduce the audio signals which correspond to said first video signals recorded on the detected areas and are recorded on other areas than said detected areas, store temporarily the reproduced audio signals, then reproduce from the recording medium the video signals corresponding to the audio signals stored temporarily, and to output the video signals thus reproduced along with the audio signals stored temporarily, and to detect by said detection determining means, when the second reproduction mode is designated by said reproduction mode designating means, areas recorded with either the first video signals or the second video signals from among the plurality of different areas on the recording medium, and to reproduce successively either the first video signals or the second video signals recorded on said detected areas.

7. An apparatus according to claim 6, wherein the first video signal or the second video signal indicates a picture image of a screen.

8. An apparatus according to claim 6, wherein the recording medium includes a disk-shaped recording medium.

9. An apparatus according to claim 6, wherein the reproduction mode instruction means includes a mode selection switch for selecting the first reproduction mode and the second reproduction mode, which are operated by an operator.

10. An apparatus according to claim 6, wherein the video signals recorded on the different areas of the recording medium in the first and second reproduction modes are successively reproduced at a predetermined period for reproduction.

* * * * *

UNITED STATES PATENT AND TRADEMARK OFFICE
CERTIFICATE OF CORRECTION

PATENT NO. : 5,715,357
DATED : February 3, 1998
INVENTOR(S) : Yamagata al.

It is certified that error appears in the above-indentified patent and that said Letters Patent is hereby corrected as shown below:

| | | | |
|---|---|---|---|
| Col. 1, line 33, | delete "be recorded" | and insert | -- be a recorded --. |
| Col. 2, line 36, | after "sequences;" | delete | -- and --. |
| Col. 19, line 41, | after "exception" | delete | -- of --. |
| Col. 20, line 49, | delete "then" | and insert | -- than --. |

Signed and Sealed this

Eighteenth Day of August, 1998

Attest:

BRUCE LEHMAN

*Attesting Officer*  *Commissioner of Patents and Trademarks*